(12) United States Patent
Poplawsky et al.

(10) Patent No.: US 6,341,218 B1
(45) Date of Patent: Jan. 22, 2002

(54) SUPPORTING AND CONNECTING A PORTABLE PHONE

(75) Inventors: Ralph C. Poplawsky, Littleton; Kathryn D. Delianides, Boulder; James T. Wilkinson, Highlands Ranch, all of CO (US)

(73) Assignee: CellPort Systems, Inc., Boulder, CO (US)

( * ) Notice: Subject to any disclaimer, the term of this patent is extended or adjusted under 35 U.S.C. 154(b) by 0 days.

(21) Appl. No.: 09/454,506

(22) Filed: Dec. 6, 1999

(51) Int. Cl.$^7$ ................................................ H04Q 7/32
(52) U.S. Cl. .................. 455/90; 455/575; 455/351; 455/569; 379/433.01; 379/428.01; 379/420.01; 379/420.04
(58) Field of Search ..................... 455/90, 575, 550, 455/569, 128, 345, 346, 347, 351, 348, 127, 572, 573, 99; 379/426, 433, 446, 455, 454, 420, 428

(56) References Cited

U.S. PATENT DOCUMENTS

| 4,782,526 A | | 11/1988 | Uchino et al. ............... 379/419 |
|---|---|---|---|
| 5,127,041 A | | 6/1992 | O Sullivan .................... 379/59 |
| 5,189,358 A | | 2/1993 | Tomura et al. ................. 320/2 |
| 5,327,481 A | * | 7/1994 | Horimoto .................... 455/569 |
| 5,333,177 A | | 7/1994 | Braitberg et al. ............. 379/59 |
| 5,535,274 A | | 7/1996 | Braitberg .................... 379/446 |
| 5,708,707 A | * | 1/1998 | Halttunen et al. ........... 379/446 |
| 5,797,088 A | * | 8/1998 | Stamegna ................... 455/345 |
| 5,825,874 A | * | 10/1998 | Humpreys et al. ............. 455/90 |
| 5,839,919 A | * | 11/1998 | Chen .......................... 455/569 |
| 6,009,168 A | * | 12/1999 | Synder et al. ............... 379/446 |
| 6,036,071 A | * | 3/2000 | Hartmann et al. ........... 455/569 |
| 6,091,611 A | * | 7/2000 | Lanni .......................... 455/569 |
| 6,138,041 A | * | 10/2000 | Yahia .......................... 455/569 |

OTHER PUBLICATIONS

Technology Update, Make your cell phone hands–free . . . in seconds!, Navigator Hands–Free Kit™. . . of Comtrad Industries –undated–.

* cited by examiner

*Primary Examiner*—William Trost
*Assistant Examiner*—Keith Ferguson
(74) *Attorney, Agent, or Firm*—Sheridan Ross P.C.

(57) ABSTRACT

An adaptor for supporting and connecting a portable electronic device, such as a portable phone, computer or other wireless communication device. The adaptor includes a pocket member and an interface module. The portable phone mechanically and electrically connects to the pocket member, and the pocket member mechanically and electrically connects to the interface module. The mechanical and electrical connections between the pocket member and the interface module are common between any interface module and any pocket member. In contrast, the receiving section of the pocket member is varied between different pocket members to accommodate portable electronic devices having different physical constructions. The pocket member attaches to the interface module with a limited, one-dimensional movement of the pocket member relative to the interface module to optimize use of space, particularly in vehicles. The pocket member and interface module may further include electrical components to enhance the functionality of the portable electronic device and the safety in operating the portable electronic device while driving by providing hands-free operation of the portable electronic device in addition to hands-free voice and data communication.

46 Claims, 17 Drawing Sheets

SUPPORTING AND CONNECTING A PORTABLE PHONE

FIELD OF THE INVENTION

The present invention relates generally to portable electronic device interfacing systems and processes. More particularly, the present invention relates to an apparatus and system for providing a mechanical and electrical interface between a universal interface module and a plurality of portable electronic devices having different physical configurations. The interface module can be located in an automobile, at home, in an office or in any other location where a power supply is available to allow access to features not offered by the portable electronic device alone. The portable electronic device may be a portable phone, portable computer, wireless data terminal or other wireless communication device or personal data assistant.

BACKGROUND OF THE INVENTION

Portable telephone systems have gained widespread acceptance as an efficient means of voice and data communications. While early mobile units were large and complex, miniaturization has made possible hand-held units with full functional telephony capabilities allowing the user freedom to use a phone in a mobile environment, such as in a vehicle or at a location remote from a hard wired connection to an existing telephony system. In addition, the cost of purchasing and using a portable phone has substantially declined and the quality and clarity of communication over a portable phone has increased causing increased and widespread demand for portable phones by the public and resulting in the proliferation of multiple configurations of portable phones by many different manufacturers.

Unfortunately, the mobility and miniaturization of portable phones, together with the widespread adoption by the general public, has created practical issues for use of such phones. For example, the very use of the phone itself by the driver of a moving vehicle, i.e., dialing and conversing while holding the phone proximate his ear and mouth, raises safety issues for not only the driver but any passenger in the driver's vehicle as well as the occupants of other vehicles. In an attempt to solve this safety and convenience problem, portable phone manufacturers have made available car kits to allow for partial hands-free use of the phone. These kits include physical hardware to retain or mount the phone in the vehicle and a power cord to access the electrical system of the car for power rather than use the phone's battery and, in some instances, may also include attachments for connecting between the phone and a user headset or the car's audio speakers, a microphone and antenna. However, while these kits allow hands-free conversation, they do not allow hands-free dialing or operation of the phone and, unless a headset is being used by the driver, even the communication may be difficult if the phone is mounted in a location sufficiently removed from the driver that the internal microphone and speaker of the phone are inadequate. Moreover, if a headset is being used, the driver may be unable to hear emergency vehicle sirens, car horns or other important audible noises that contribute to safe driving.

Additionally, because there is a large variety of portable telephones in existence, each with its own unique mechanical, electrical and control interface, no single car kit can provide any form of universal connection among different phones and the power supply offered by the electrical system of a vehicle. Thus, consumers must have a different kit for every different phone, a problem which is occurring with greater frequency due to rapidly increasing technical capabilities and performance in new phones and the decreasing cost of portable phones, and as different members of the same family acquire portable phones for their individual use. Similarly, automobile fleet users, such as large corporations, cannot provide a universal car kit connection for the variety of phones their employees may use and car rental companies cannot provide users with means to use their portable phones, or any other type of portable electronic device, in rented vehicles. Thus, users are forced to abandon their investment in the car kit when purchasing new models of telephones or users operate hand-held electronic devices while driving rather than purchasing an inadequate car kit for their car; an unsafe condition which is subject to increasing governmental concern and regulation.

Yet another issue raised by currently available phone mounting kits for cars is the adequacy of the mounting mechanism. Because space is a premium commodity in the passenger compartment of a vehicle, a phone mounting mechanism cannot be too large or too cumbersome. Depending upon where the mounting mechanism may be installed, i.e., on or under the dashboard or on the console between the front seats, space constraints may preclude certain types of mounting mechanisms. Moreover, vehicle safety requirements, such as have been promulgated by governmental agencies and telephone industry associations, require that any mechanism for mounting a portable phone in a vehicle be able to withstand impact forces up to twenty-five pounds in order to minimize the danger of the phone being dislodged in an accident and causing damage to an occupant of the vehicle. Additionally, the mounting mechanism, whatever its configuration, must be able to withstand normal road vibrations without failure.

One attempt to address the foregoing problems is found in U.S. Pat. No. 5,535,274 entitled Universal Connection For Cellular Telephone Interface. Therein, the inventors describe a mounting kit for a car which includes a common interface module and a pocket adapter. A portable phone mounts in the pocket and the pocket attaches to the interface module with a sliding movement along the longitudinal axis of the interface module. The pocket further includes an electrical connector which connects the internal electronics of the phone to the pocket. The interface module is electrically connected to the pocket by a flexible cord. Power for operating the phone and charging its battery is provided through the cord as is a connection to an external antenna. In addition, the interface module may include a microprocessor for managing communications with the phone and a memory device for storing operating parameters relating to the phone being used with the device. While this invention addresses certain of the foregoing issues, the interconnection between the pocket and the interface module can be improved. The sliding action for engagement of the retaining clip on the interface module by the latching assembly on the pocket member uses too much space. Moreover, it is unlikely that this mechanism dampens road vibrations or adequately secures the phone and pocket to the interface module during an impact.

Other efforts have been made to provide a latching mechanism that will withstand impact as well as road vibration, but these devices are also lacking. For example, U.S. Pat. No. 5,189,358, entitled Adapter For Mounting Portable Radio Apparatus To Moving Body And Charger For Portable Radio Apparatus, describes a portable phone mount for use in a vehicle where a retaining slot in the base of the phone first engages a lug in the adapter device and the phone is then rotated clockwise until the upper portion of the phone body engages a pair of ratchets in the mounting mechanism. While this mechanism may adequately secure the phone in the mount, the motion required to mount the phone is inefficient. It fails to minimize the use of space in the vehicle.

SUMMARY OF THE INVENTION

The present invention provides an improved mounting system for use with portable electronic devices, as well as an enhanced support system which not only facilitates use of the portable electronic device, but advantageously expands the features available to the user via the portable electronic device. As used herein, the term portable electronic device is intended to refer to not only portable phones, but portable computers, ham radio devices, other types of wireless communication devices, wireless data terminals and other types of personal data assistants (PDAs).

The system includes a pocket member and an interface module. The interface module may be mounted in a vehicle or at any other location where it can be attached to a power source. The interface module connects to a pocket member through a universal or common mounting mechanism. The pocket member includes a receiving section for supporting and connecting to a portable electronic device such as a portable phone. Thus, while the receiving sections of pocket members will vary from one pocket member to another to accommodate portable electronic devices of different types and manufacturers, the mechanism for connecting a pocket member to the interface module will be common. In this way, all pocket members can interface with an interface module, regardless of the type of portable electronic device and receiving section embodied in the pocket member. As a result, an interface module may be mounted at a single location, such as within a single vehicle, but used with a plurality of pocket members which support different portable electronic devices. In addition, a user may acquire multiple interface modules and place them at convenient locations, such as in a car, at home and at the office, and use a single pocket member in combination with each interface module.

The common mounting mechanism between the pocket member and the interface module is designed to optimize space utilization requirements. Rather than employing a sliding or rotational engagement between the pocket member and the interface module or some other complex motion which requires critical open space surrounding the mounting unit to accomplish a secure mounting of the portable electronic device in the vehicle, the present invention utilizes a limited, one dimensional motion to engage a latch mechanism between the pocket member and the interface module. As the pocket member is seated in the interface module using a short one dimensional movement of the pocket member, the latching mechanism moves from a first unengaged position to a second engaged position to secure the pocket member to the interface module. The latching mechanism includes one or more tabs which extend out of the interface module and into the pocket member to attain securement of the two components. In the preferred embodiment the tabs are offset such that they engage the pocket member sequentially rather than simultaneously. This reduces the amount of force needed to engage the tabs in the pocket member without compromising the strength of the engagement. The overall result is an improved latching mechanism that requires a minimum amount of space to use and one that fully satisfies all government safety requirements regarding vehicle impact tests.

A further advantage of the present invention is that the interface module may be mounted to a vehicle dashboard or center console solely through access to the exposed surface of the interface module. In many existing portable phone mounts, the installer must gain access to the backside of the mounting surface. The interface module of the present invention is designed with multiple apertures that extend through its body to allow easy mounting through the exposed or outer mounting surface. The design conforms to new industry standards for portable phone mounting in vehicles.

In addition to the foregoing improved mounting mechanisms, a need also exists to provide enhanced features to portable phone users as more and more people seek ways to improve productivity in their business and personal lives. Because many people spend a significant amount of time in their cars, improving the functional capabilities of portable phones as used in automobiles will potentially make people more productive while simultaneously making use of the phones more safe. The present invention provides solutions to these problems. First, the vehicle mounting mechanisms allow for hands-free use in an automobile, making driving safer during phone conversations. Hands-free use can be further optimized by connecting the portable phone to a power source to preserve battery life, to simultaneously charge the battery while the phone is in use, and to amplify the audio capabilities of the portable phone by connecting it to external speakers, such as the speakers in the vehicle stereo system, to an external microphone to enhance reception of the user's voice and to an external antenna for improved reception and less dropped calls. All of these capabilities can be achieved through the electronics provided in the interface module.

In still other embodiments of the present invention other improved capabilities and features can be offered. For example, the interface module can include a microprocessor and memory which can store voice recognition software. Thus, the phone and all of its features can be operated by voice commands rather than manual activation of buttons on the phone key pad. Rather than manually dialing the phone while driving, the user can simply activate the phone through voice commands. This can include accessing a phone number from a phone book stored in the phone's memory, or some other portable electronic device or PDA, and instructing the phone to call the number. The memory can also be used for voice dictation to create letters, memos or to store notes and other thoughts while driving. This kind of memory feature can also be included in the pocket member and function like a portable dictation device. Because the phone and pocket member are detachable from the interface module and therefore portable, the pocket member can be detached from the car and moved to another interface module at home or the office where the memory can be transferred to another device, such as a computer, for further use.

It is also contemplated that the interface module can further include software and processing capabilities for converting voice into text and text into voice. For example, the portable phone can be used for Internet access and information received in an analog or digital text format can be converted into an audio format for the convenience of the user. More specifically, the user could access and receive e-mail messages that can be converted into audio messages while driving. The user could also receive any other information from the Internet or perform transactions such as buying and selling stock, accessing bank accounts and obtaining credit information., etc. The interface module can also be used to communicate with, or between, PDAs located near and/or remote from the interface module including Internet protocol (IP) capable PDAs. The interface module can also communicate with a data connector port associated with the adaptor or pocket. In the context of vehicle usage, the interface module can operate in the vehicle to obtain or execute vehicle bus diagnostic information.

DETAILED DESCRIPTION OF THE PREFERRED EMBODIMENT

The following description of the preferred embodiment is made with reference to a portable phone. It should be understood that a portable phone is one example of the type of portable electronic device that can be used with the present invention and that other portable electronic devices could be substituted for the portable phone.

Figure 1:
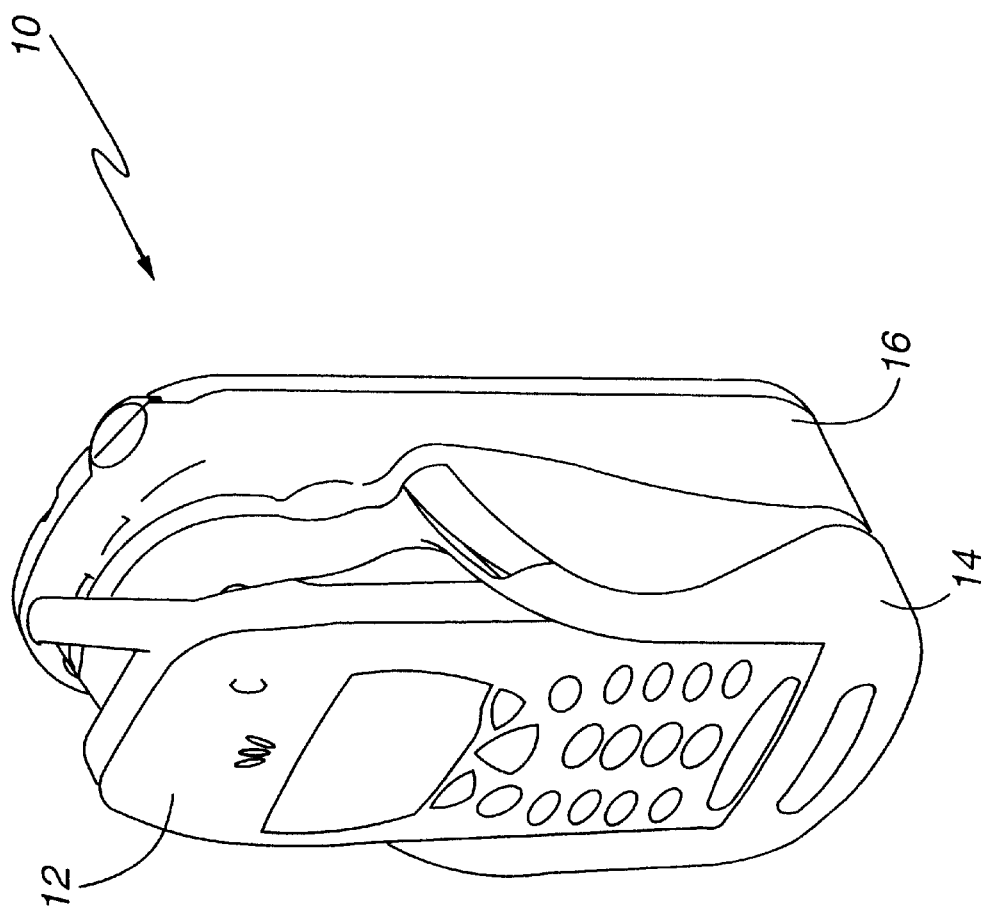
FIG. 1 is a front three-quarter perspective view of an embodiment of the present invention in its fully-assembled form.
Figure 2:
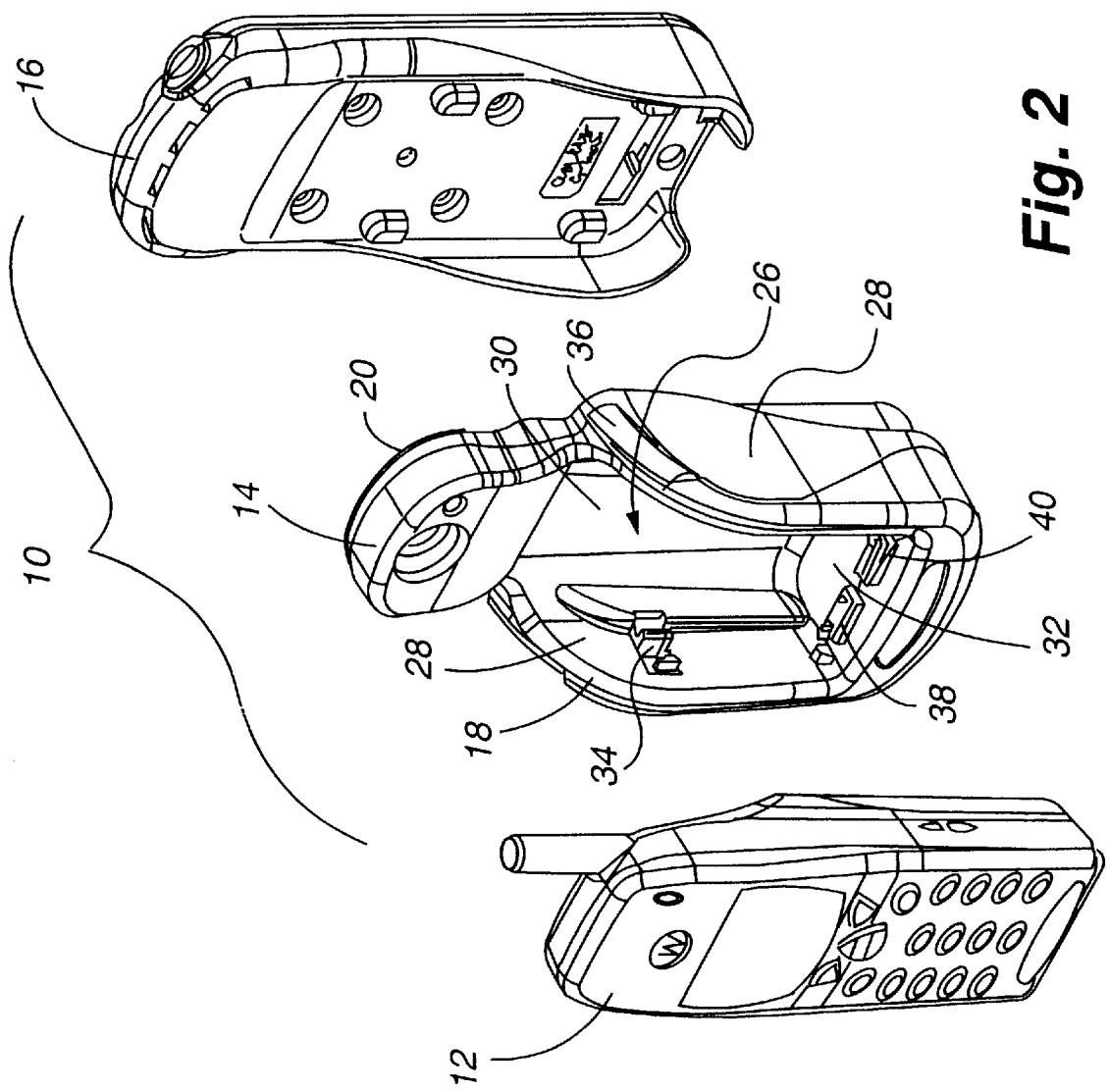
FIG. 2 is a front three-quarter perspective view of an embodiment of a portable phone, pocket member and interface module of the present invention.

Turning to FIGS. 1 and 2, an embodiment of the present portable phone interface system 10 is shown. The primary components are a portable phone 12, a pocket member 14 and an interface module 16. The pocket member 14 has a front shell 18 and a rear shell 20, more easily seen in FIGS. 3 and 4. The interface module 16 is also assembled from a front shell 22 and a rear shell 24, as is more easily seen in FIGS. 6 and 7.

The portable phone 10 sits within a recess 26 in the front shell 18 of the pocket member 14. In turn, the rear shell 20 of the pocket member 14 is configured to attach to the front shell 22 of interface module 16. Although not shown in the figures, the interface module 16 is primarily intended to be mounted in an automobile where it can be attached to the car's power supply and, perhaps other peripheral devices, including a separate or remote antenna, a microphone, the vehicle audio system, a head set having a microphone and ear phones, the vehicle ignition, a remote keypad, a control interface or vehicle bus for data access, or any other type of device consistent with enhancing the functionality of the phone for the benefit and safety of the user and others. The present interface system, however, is not solely limited to use in vehicles, but can be utilized in any location where portable electronic devices, including communication devices or portable phones, can be used and primarily in locations with access to a power supply such as home or office. Moreover, the interface module 16 is a universal adapter; it is designed to interface with every pocket member 14 even though the pocket members 14 are designed to interface only with a specific type of portable electronic device, portable phone or other device 12 due to differences in physical design and electrical operation. Thus, even though a pocket member 14 is designed solely to accept a single manufacture's phone and a second pocket member 14 is designed to only accept a different type phone, both pocket members 14 will connect with any interface module 16 due to a common interface.

Figure 3:
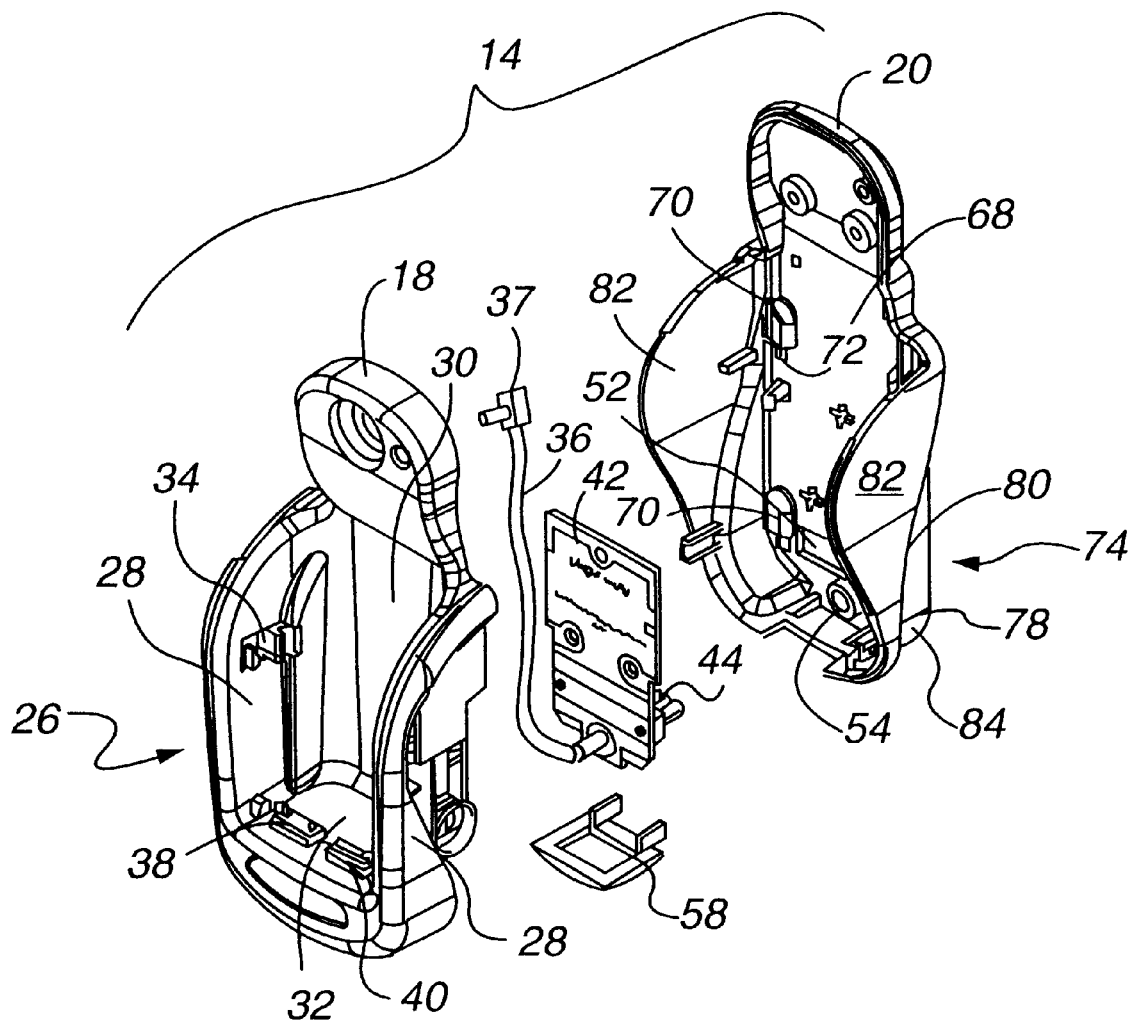
FIG. 3 is a front three-quarter exploded perspective view of an embodiment of a pocket member of the present invention.

As shown in FIGS. 2 and 3, the front shell 18 of the pocket member 14 includes a pocket or receiving section 26, primarily defined by the side walls 28, the back wall 30 and the base 32, in which a specific type of portable phone is mounted. The side walls 28, back wall 30 and base 32 are designed to receive the body of a specific type of portable phone and therefore would be configured differently for different portable phones. The receiving section 26 further includes a latching mechanism 34 to secure the portable phone when it is seated within the pocket member 14 and a release mechanism (not shown) to disengage the latching mechanism 34 and release the phone 12 from the pocket member 14. Electrical contacts 38 and 40, positioned in the base 32, are designed to mate with the particular electrical contacts (not shown) of the intended phone 12. As should be appreciated by one skilled in the art, the electrical contacts are configured differently for each different portable phone configuration.

The pocket member 14 serves at least two purposes. First, it mechanically engages the phone and second, it creates an electrical connection between the phone and the interface module 14. The mechanical connection between the phone and the pocket member is illustrated in FIGS. 2 and 3. The electrical connection is illustrated in FIGS. 3 and 4.

With respect to the electrical connection between the phone and the pocket member, as stated previously, electrical contacts 38 and 40 are positioned in the base 32 of the receiving section 26 of the front shell 18 to contact complementary electrical contacts in the body of the phone 12. An internal flexible cable (not shown) connects the electrical contacts 38 and 40 to a printed circuit board 42 positioned between the front and rear shells 18 and 20. A 30 pin connector 44 is mechanically and electrically mounted to the base of the printed circuit board 42 and a coaxial cable connector 46 is also mechanically mounted to the printed circuit board 42 proximate the 30 pin connector 44 to maintain alignment with the 30 pin connector 44. As most easily seen in FIG. 3, the coaxial connector 46 includes a coaxial cable assembly 36 connected to the coaxial connector 46 at one end and coaxial connector 37 at the opposite end for interconnection to the phone 12. If desired, the internal antenna of the phone can be connected to an external antenna (not shown), such as the antenna for the car radio, by accessing the internal antenna through the coaxial cable assembly 36 or, in some instances, through the electrical contacts 38 or 40, which connection is routed through the coaxial connectors 46 and 48 into the interface module 16 and ultimately connected to the external antenna for enhancing the reception of the phone. The electrical contacts 38 and 40 and the 30 pin connector 44 provide electrical communication with the portable phone. The 30 pin connector 44 allows segregation of and access to various features of the phone such as the phone power supply, battery charge circuitry, serial/digital data transfer circuitry and audio data transfer circuitry, and further allows control signals to be sent to and from the phone for controlling different functions of the phone, such as battery charging, and for enhancing the capabilities of the phone, such as by incorporating voice recognition software and hardware into the interface module which would be activated by commands made into the phone.

Figure 4:
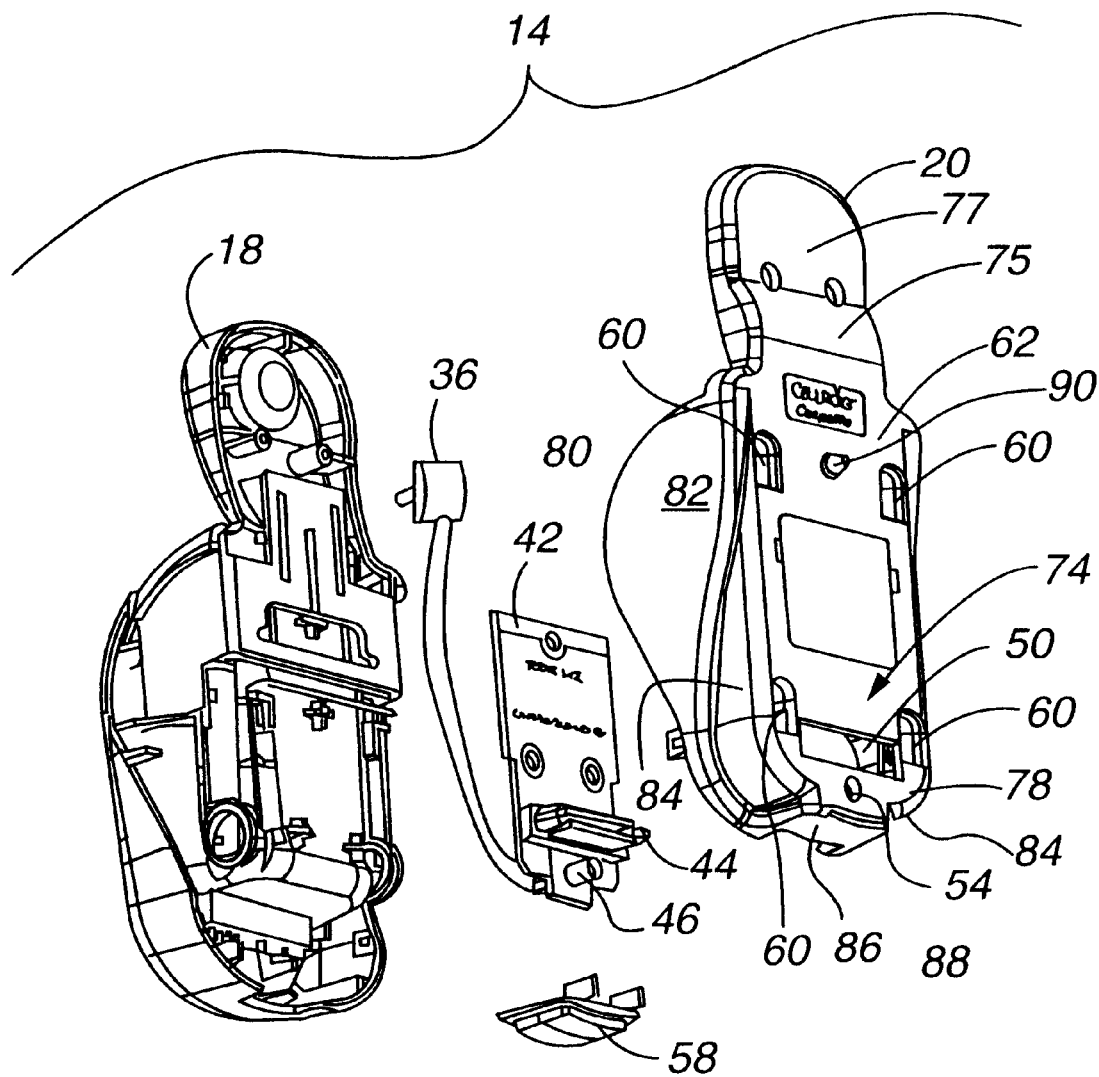
FIG. 4 is a rear three-quarter exploded perspective view of an embodiment of a pocket member of the present invention.

As also seen in FIGS. 3 and 4, a rectangular aperture 50 is formed in the rear shell 20 of the pocket member in order that the 30 pin connector 44 can extend out of the rear wall of the pocket member 14 and connect to a complementary 30 pin connector 52 in the interface module 16. Similarly, a second aperture 54 is formed in the rear wall of the rear shell 20 in order to allow the coaxial cable connector 46 to extend out of the pocket member 14 and connect to a complementary coaxial cable connector 56 in the interface module 16. The printed circuit board 42 and/or electrical connectors 38 and 40 are further designed to move in both the x and y directions (horizontally and vertically as depicted in the Figures) relative to the apertures 50 and 54 to facilitate connection with the complementary connectors 52 and 56 in the interface module 16. A cover panel 58 allows access to the printed circuit board 42 and is designed to be replaced by a data connector which will be electrically connected to the printed circuit board 42 to further enhance the functionality of the phone. Of course, it should be understood by those skilled in the art that other types of connectors than those disclosed can be used to accomplish the same results.

Figure 10:
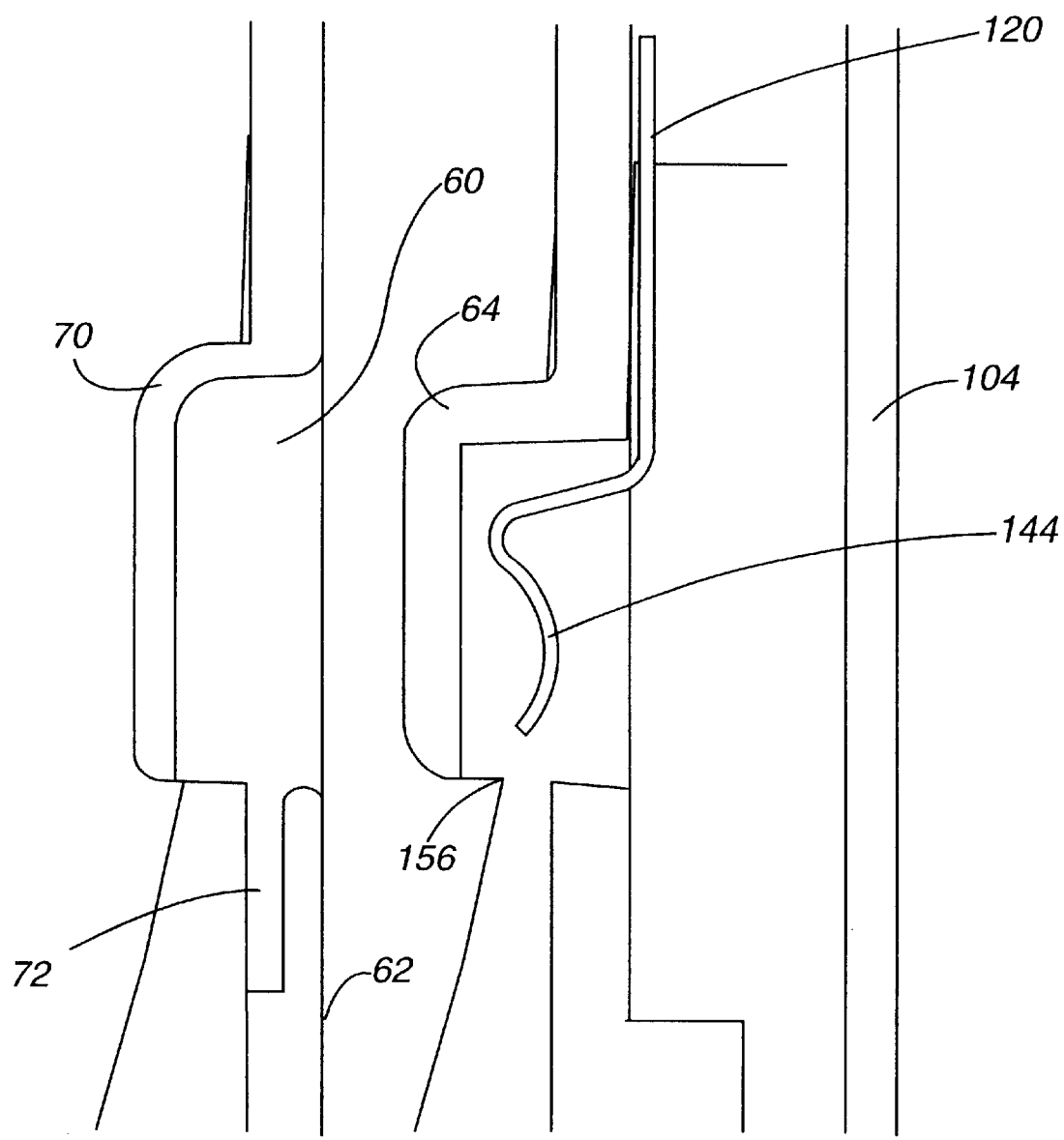
FIG. 10 is a partial cross-sectional view of an embodiment of a pocket member and an interface module of the present invention, with the latch tab in an unlocked position.
Figure 12:
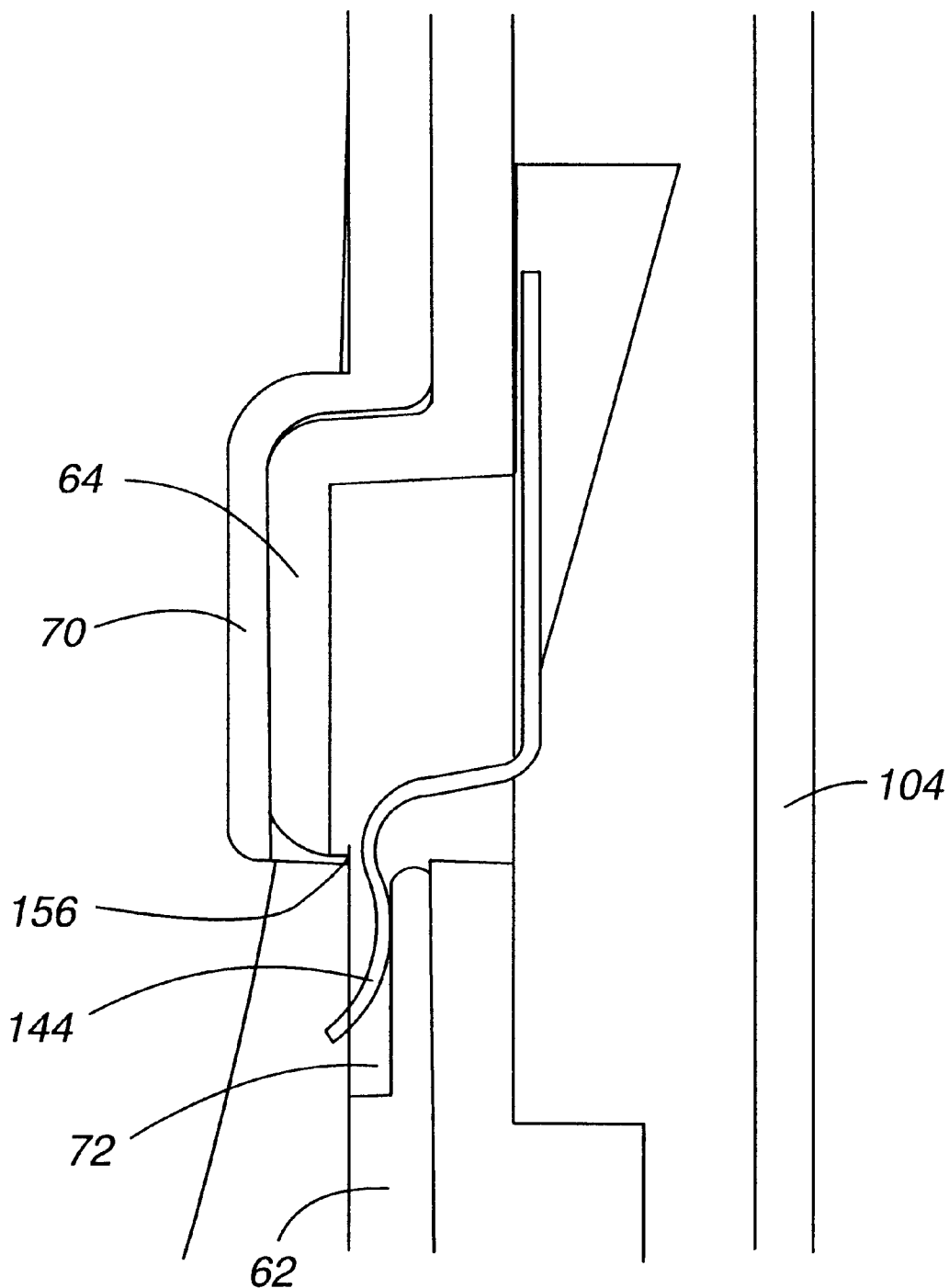
FIG. 12 is a partial cross-sectional view of an embodiment of a pocket member and an interface module of the present invention, with the latch tab positioned in the fully locked position.
Figure 13:
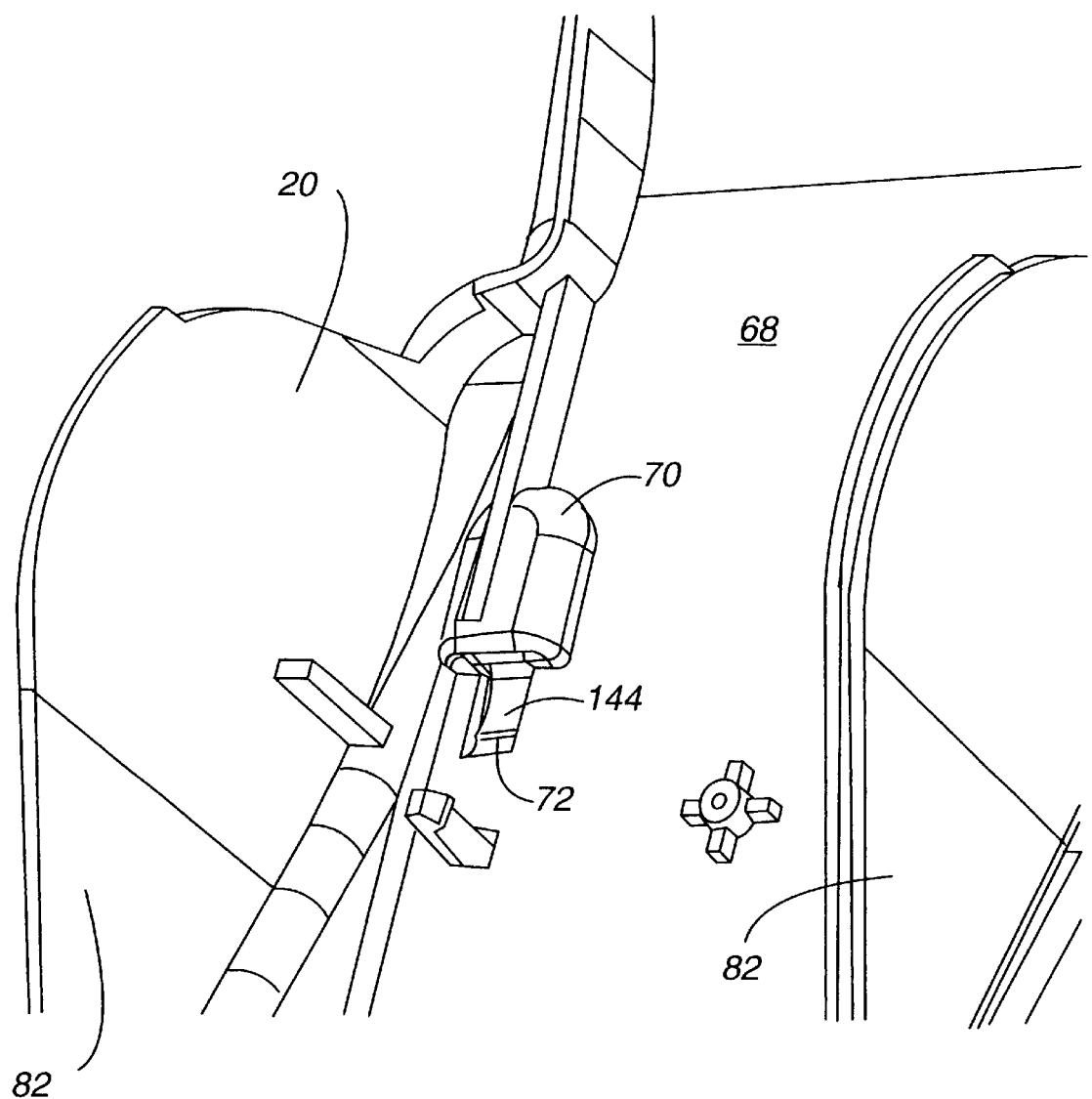
FIG. 13 is an enlarged partial front three-quarter perspective view of an embodiment of a pocket member of the present invention, showing the inside surface of the rear shell of the pocket member engaged by an interface module.
Figure 14:
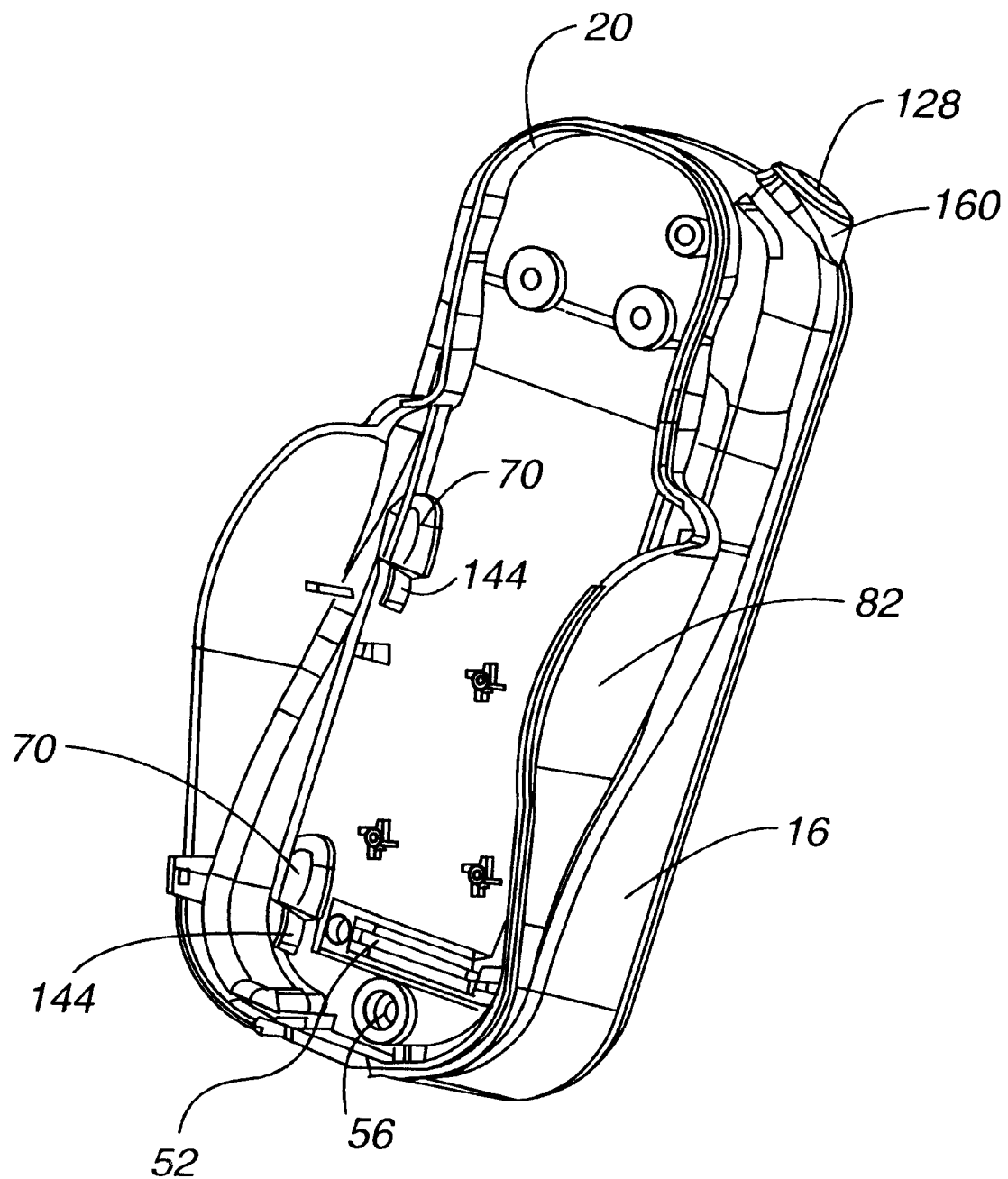
FIG. 14 is a front three-quarter perspective view of an embodiment of the present invention, showing a rear shell of a pocket member fully engaged by an interface module.

A further important feature is the mechanical latching mechanism between the pocket member 14 and the interface module 16. FIGS. 3 and 4 show the elements of the pocket member 14 which are involved in the universal or common mechanical connection between the pocket member 14 and the interface module 16. More specifically, in the preferred embodiment, four apertures 60 are formed in the rear wall 62 of the rear shell 20. These apertures 60 are designed to receive four protuberances 64 formed on the face 66 of the front shell 22 of the interface module 16 (see FIG. 5). The protuberances 64 are designed to fit in the apertures 60 and to restrict lateral and longitudinal movement of the pocket member 14 and interface module 16 relative to each other. As illustrated in FIG. 3, on the inside surface 68 of the rear shell 20 of the pocket member 14, each aperture 60 is covered on three sides by a cover or dome 70. As is also shown in FIG. 3, as well as in FIGS. 10 and 12–15, channels 72 are formed in the inside surface 68 of the rear shell 20 adjacent and below each aperture 64. The domes 70 are open along the bottom edge, as depicted in FIGS. 10 and 12, to provide access to channels 72.

Figure 6:
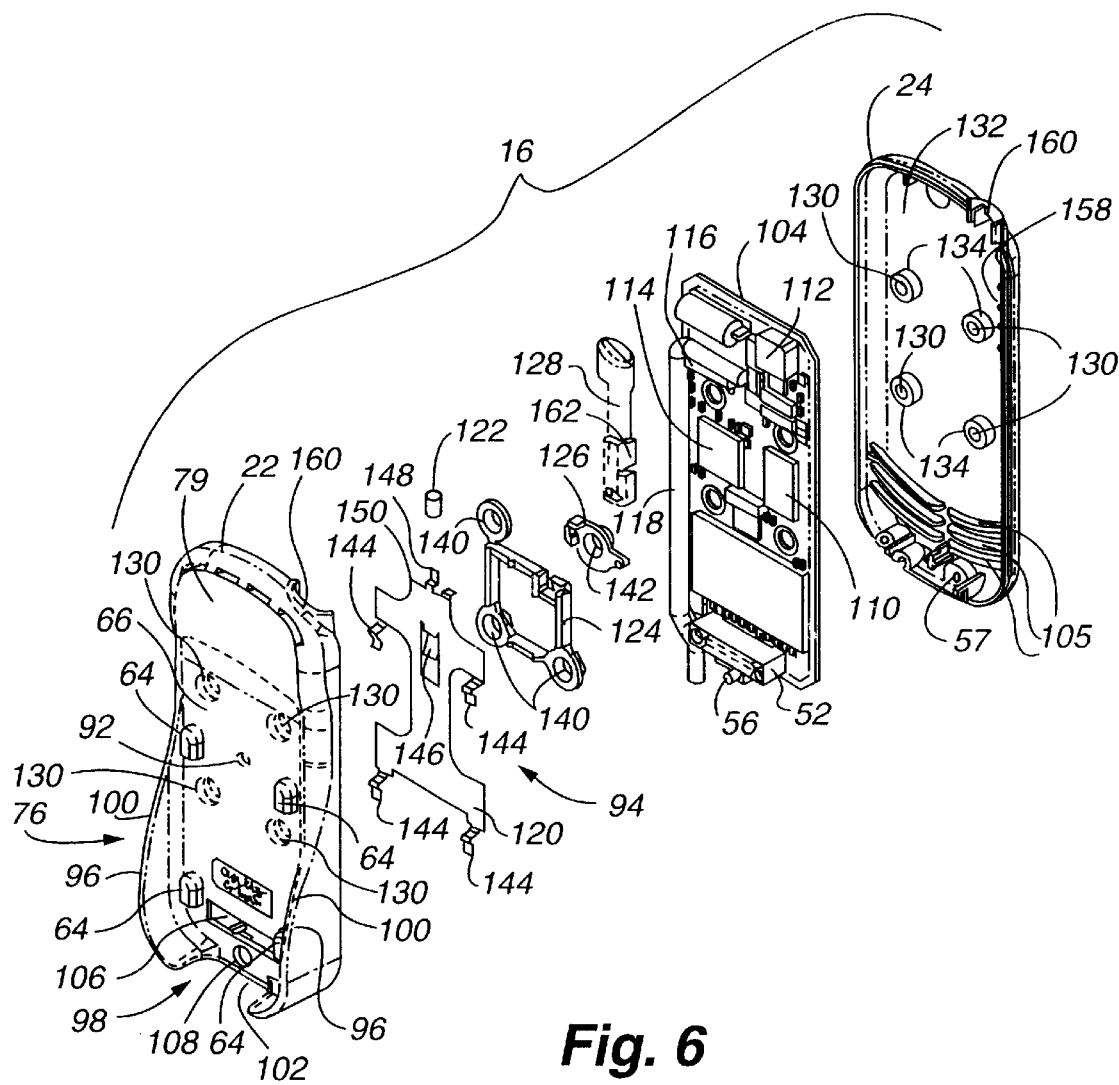
FIG. 6 is a front three-quarter exploded perspective view of an embodiment of an interface module of the present invention.

In addition to the alignment provided by the four protuberances 64 engaging the four apertures 60 and domes 70, the outer surface of the rear shell 20 of the pocket member 14 is also configured to assist in mating the pocket member 14 with the interface module 16. As shown in FIG. 4, the rear shell 20 of the pocket member includes a mounting section 74. The mounting section 74, like the protuberances 64 and apertures 60, is identical in all pocket members 14 and is designed to mate with a complementary receiving section 76 on the front shell 22 of the interface module 16. Similarly, the rear wall 62 of the pocket member 14 includes an angled portion 75 and head portion 77 which cooperate with a raised surface 79 on the front face 66 of the interface module 16 for proper alignment of the two bodies during mechanical connection (FIGS. 2, 4 and 6). In this manner, the connection between any pocket member 14 and an interface module 16 will be universal and only one style of interface module will be needed to connect with any of a number of configurations of pocket members.

The mounting section 74 includes a raised body portion 78 generally defined by a laterally extending ridge 80 formed by the side wall 82 of the rear shell 20. The raised body portion 78 has a pair of side walls 84 which merge at a base member 86 extending longitudinally from the raised body portion 78. A second ridge 88 extends outwardly from the base member 86. The rear shell 20 of the pocket member 14 further includes an outwardly extending pin 90. The pin 90 extends into a release hole 92 formed in the front shell 22 of the interface module 16 and, as will be explained in more detail below, activates the latching mechanism 94.

Figure 5:
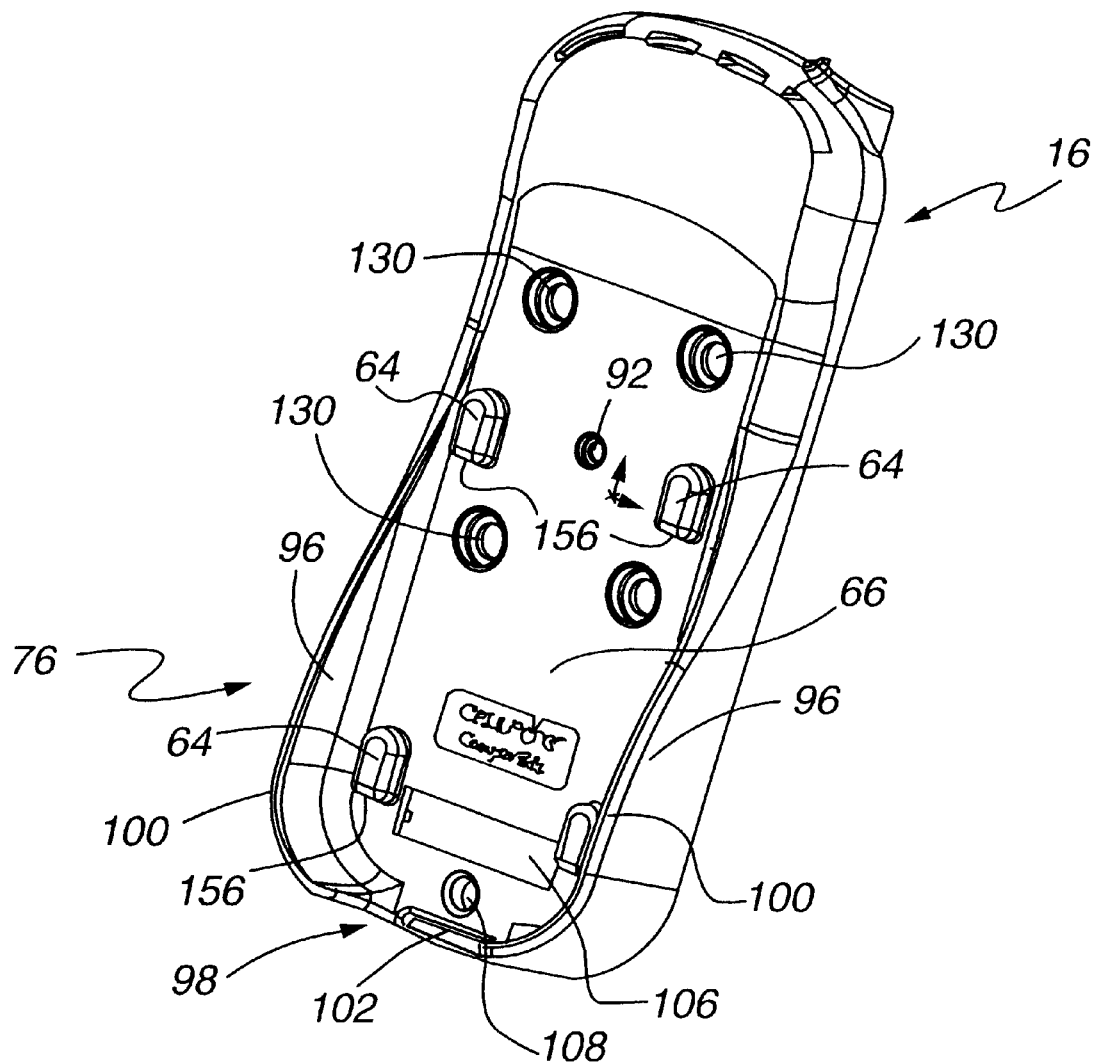
FIG. 5 is a front three-quarter perspective view of an embodiment of an interface module of the present invention.

The receiving section 76 of the interface module 16 is also shown in FIGS. 5 and 6. The receiving section 76 includes a pair of raised flanges or side walls 96 which terminate at the lower portion of the interface module 16 to form a recess 98. The raised flanges 96 are configured to engage the side walls 84 of the raised body portion 78 of the pocket member 14 such that the body portion 78 of the pocket member 14 nests inside the flanges 96 of the interface module 16 and the top edge 100 of the flanges 96 abut the ridge 80 (see FIGS. 1 and 4). In addition, the base portion 86 fits within the recess 98 such that the ridge 88 seats itself in the slot 102 formed in the outer surface 66 of the front shell 22 of the interface module 16. This alignment of the mounting section 74 of the pocket member 14 and the receiving section 76 of the interface module 16 further aligns the protuberances 64 with the apertures 60 and the 30 pin connector 44 and coaxial connector 46 with the matching 30 pin connector 52 and coaxial connector 56 in the interface module 16.

Figure 7:
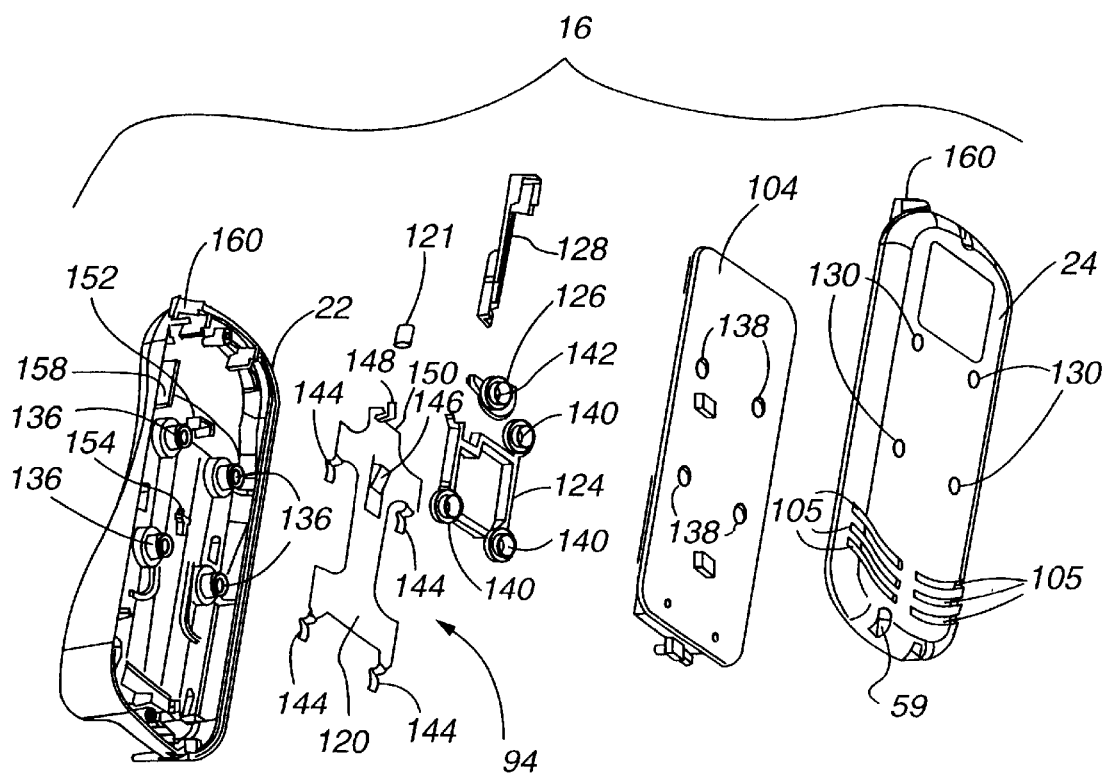
FIG. 7 is a rear three-quarter exploded perspective view of an embodiment of an interface module of the present invention.

As shown in FIG. 6, a printed circuit board 104 is also disposed in the interface module 16. The 30 pin connector 52, which matches the 30 pin connector 44 in the pocket member 14, is electrically and mechanically connected to the printed circuit board 104 at its base. The coaxial connector 56 is mechanically mounted adjacent the printed circuit board 104 by a mounting bracket 57 in the rear shell 24 of the interface module 16. An external coaxial cable (not shown) interconnects an external antenna to the coaxial connector 56 through a port 59 in the rear shell 24 (FIG. 7). These two connectors 52 and 56 extend through a pair of complementary openings 106 and 108 in the front shell 22 of the interface module 16 to connect with the 30 pin connector 44 and coaxial connector 46 of the pocket member. Thus, unlike other portable phone mounts, no external or separate cable is needed to electrically connect the phone to the mounting device.

The configuration of the mechanical connection between the pocket member 14 and the interface module 16 also protects the integrity of the electrical connectors. As should be appreciated from the foregoing description and the accompanying Figures, the pocket member 14 engages the interface module 16 via a limited, one-dimensional movement. In other words, the two components are simply pressed together, without the need of any complex multi-dimensional or rotational movement of one component relative to the other. Indeed, if a rotational movement were used to separate the pocket member 14 from the interface module 16 once they are engaged, the electrical connectors could be damaged, i.e., the pins could be bent or broken. However, the engagement of the ridge 88 in the slot 102, together with the engagement of the flanges 96 with the side walls 84 of the raised body portion 78 preclude any rotational or two-dimensional movement of the pocket member 14 and interface module 16 relative to each other during installation or removal. This preserves the integrity of the electrical connection and enhances the quality and life of the product.

The internal elements of the interface module 16 include the latching mechanism 94, which locks the interface module 16 to the pocket member 14, and the printed circuit board 104 (see FIGS. 6 and 7) which has been previously identified. The printed circuit board 104 includes various electronic componentry for enhancing the usefulness and capabilities of a portable phone. These electric components include, but are not limited to, a microprocessor 110, a power supply 112, a digital signal processor 114 and a cable connector 116 and cable harness 118 for interconnecting the electronics on the printed circuit board 104 with external devices, including a power supply (not shown). Louvered vents 105 are positioned in the rear shell 24 to provide air flow for cooling the various electronic components. The latching mechanism 94 includes a latch plate 120, a plate spring 122, a spacer 124, a rotating lever 126 and a release rod 128. As is explained in greater detail below, the latch plate 120 moves between a first (unlocked or disengaged) position and a second (locked or engaged) position in order to secure the pocket member 14 to the interface module 16.

As further seen in FIGS. 6 and 7, the front shell 22 and rear shell 24 of the interface module 16 include four apertures 130 for purposes of receiving screws or other connectors (not shown) for assembling the interface module 16 and which can also be used for attaching the interface module 16 to the dashboard or seat console in a car. Because the apertures 130 extend through the front and rear shells 22 and 24 of the interface module 16, the interface module 16 may easily be mounted to the dashboard or console with access only to the front shell 22. Therefore, unlike other devices, the interface module 16 is not mounted solely via access to the rear shell 24.

The inside surface 132 of the rear shell 24 has an inwardly extending hollow rear post 134 adjacent each aperture 130. Each aperture 130 in the front shell 22 similarly has an adjacent hollow front post 136 extending into the interface module 16. The rear posts 134 extend through four apertures 138 in the printed circuit board 104. The four front posts 136 extend around the latch plate 120, through the bushings 140 in the spacer 124, through an opening 142 in the rotating lever 126 and seat inside the rear posts 134. The spacer 124 separates the latching mechanism 120 from the printed circuit board 104 and secures the latching mechanism against the front shell 22.

Figure 8:
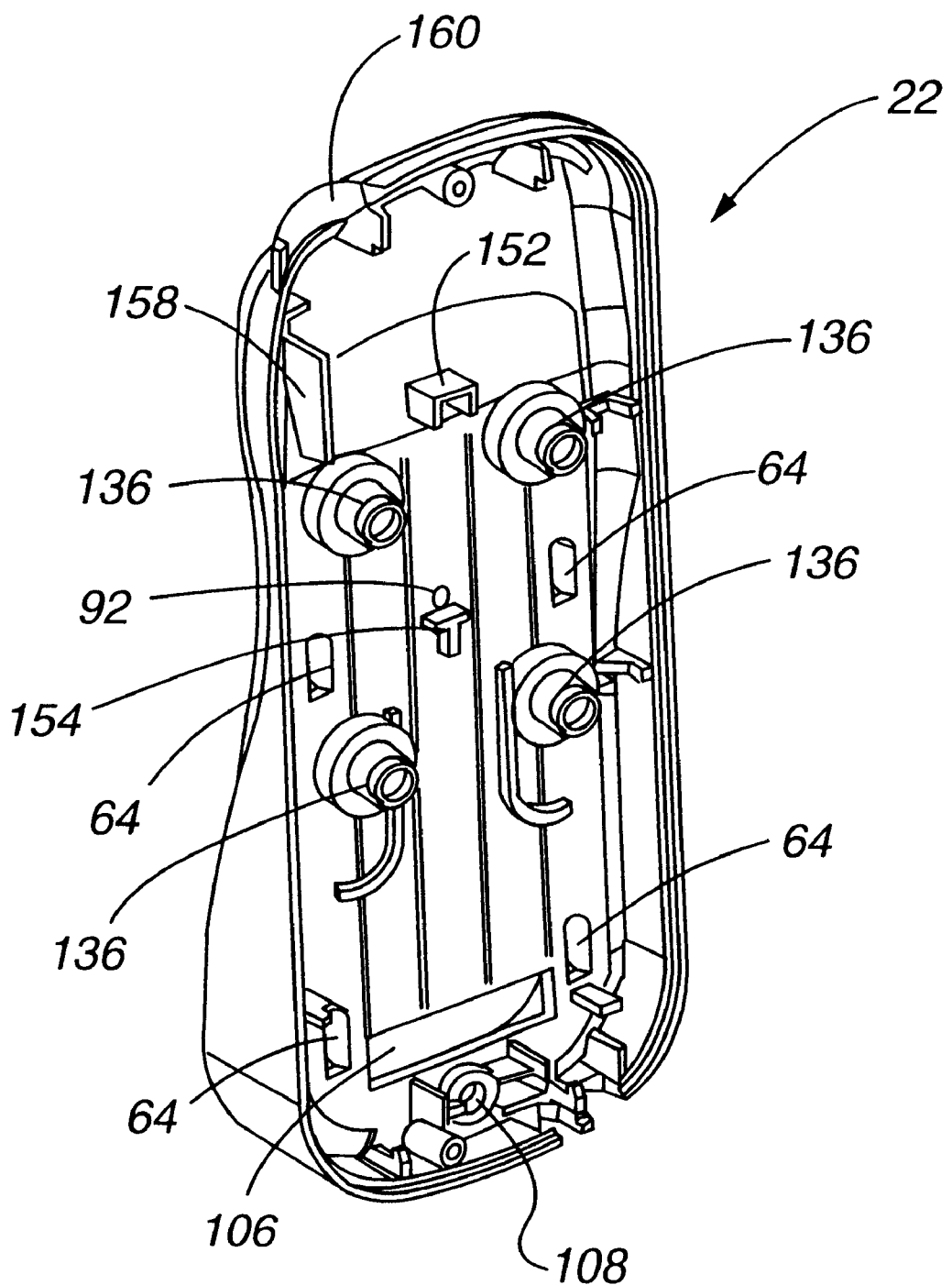
FIG. 8 is a rear three-quarter perspective view of an embodiment of a front shell of an interface module of the present invention.

As also seen in FIGS. 6 and 7, the latch plate has four latch tabs 144, a release tab 146 and a spring tab 148. The plate spring 122 is positioned between the upper edge 150 of the latch plate 120 and a spring restraint 152 formed on the inside surface of the front shell 22 (see FIG. 8). When fully assembled, the spring tab 148 sits inside a plate spring 122. Because the plate spring 122 is in compression, it applies a downward force against the latch plate 120, as depicted in FIGS. 6 and 7. The inside surface of the front shell 22 of the interface module 16 also includes a release tab shelf 154. The release tab shelf 154 is positioned adjacent the pin release hole 92 formed in the front shell 22. The latching tabs 144 extend forward from the plane of the latch plate 120 and, although not readily discernable from the Figures, in the preferred embodiment each latching tab 144 is separated or offset from the latch plate 120 at a different distance than the others (see FIG. 15). When the interface module 16 is fully assembled, the latch tabs 144 are positioned in the protuberances 64.

Figure 9:
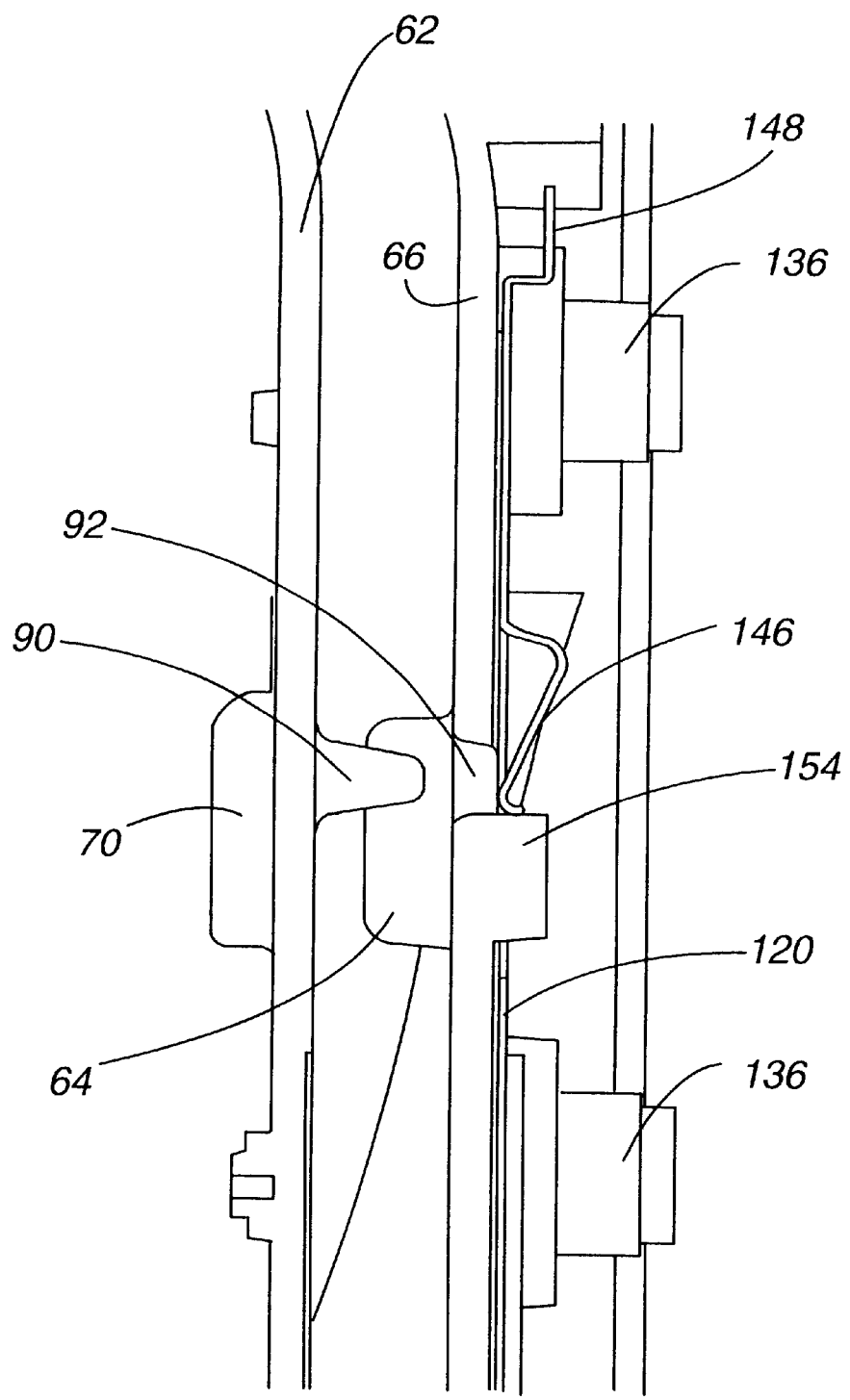
FIG. 9 is a partial cross-sectional view of an embodiment of a pocket member and an interface module of the present invention, with the latch release mechanism in the unlocked position.
Figure 11:
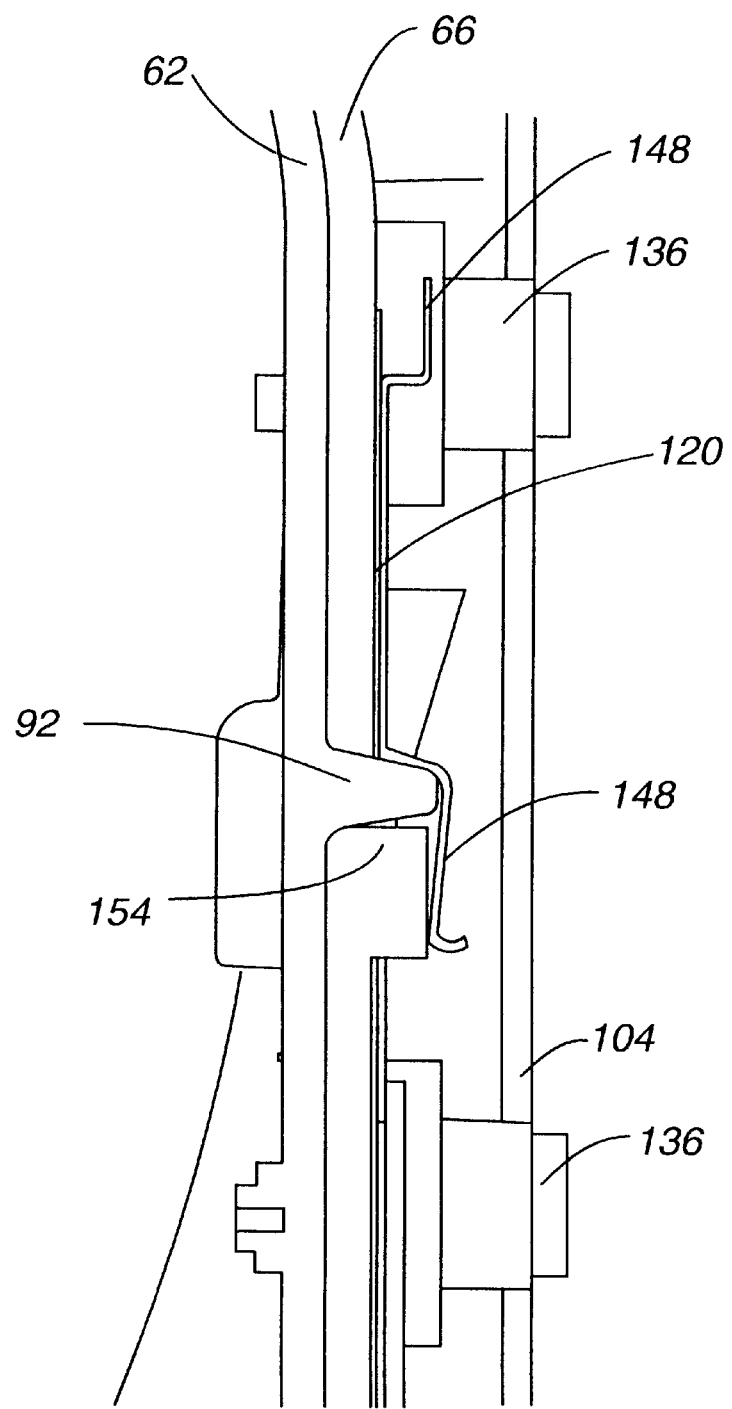
FIG. 11 is a partial cross-sectional view of an embodiment of the latch release mechanism portion for the pocket member and an interface module of the present invention, with the pocket member and interface module fully engaged and locked together.

To activate the latching mechanism 94 and lock the interface module 16 to the pocket member 14, the latch plate 120 moves between a first and second position. In the first position or the unlocked position, the release tab 146 rests against the release tab shelf 154 and the protuberances 64 are seated inside the recesses 60 and domes 70 of the pocket member 14 so that the latch tabs 144 are positioned adjacent and above the opening 156 in the protuberances 64. The latch plate 120 is moved to the second position, or the locked position, by the pin 90 extending into the pin release hole 92 as the pocket member 14 is moved into physical engagement with the interface module 16 (FIGS. 9 and 11). This limited, one-dimensional motion forces the release tab 146 off of the release tab shelf 154 (FIG. 11). When the release tab 146 is no longer engaged by the release tab shelf 154, the plate spring 122 forces the latch plate 120 downwardly as depicted in the Figures to a second or locked position. In moving to the second position, the latch tabs 144 move out of the openings 156 and engage the channels 72 in wall 68 of the rear section 20 of the pocket member 14 (FIGS. 10 and 12–14).

Premature activation of the latching mechanism prior to the pocket member 14 being seated squarely in the interface module 16 is avoided because of the alignment provided by the mounting section 74, angled portion 75 and head portion 77 of the pocket member, the receiving section 76 and raised portion 79 of the interface module. Each of the involved members compels proper alignment of the pocket member relative to the interface module such that the protuberances 64 are fully positioned in the apertures 60 prior to the release pin 90 activating the locking mechanism 94.

Figure 15:
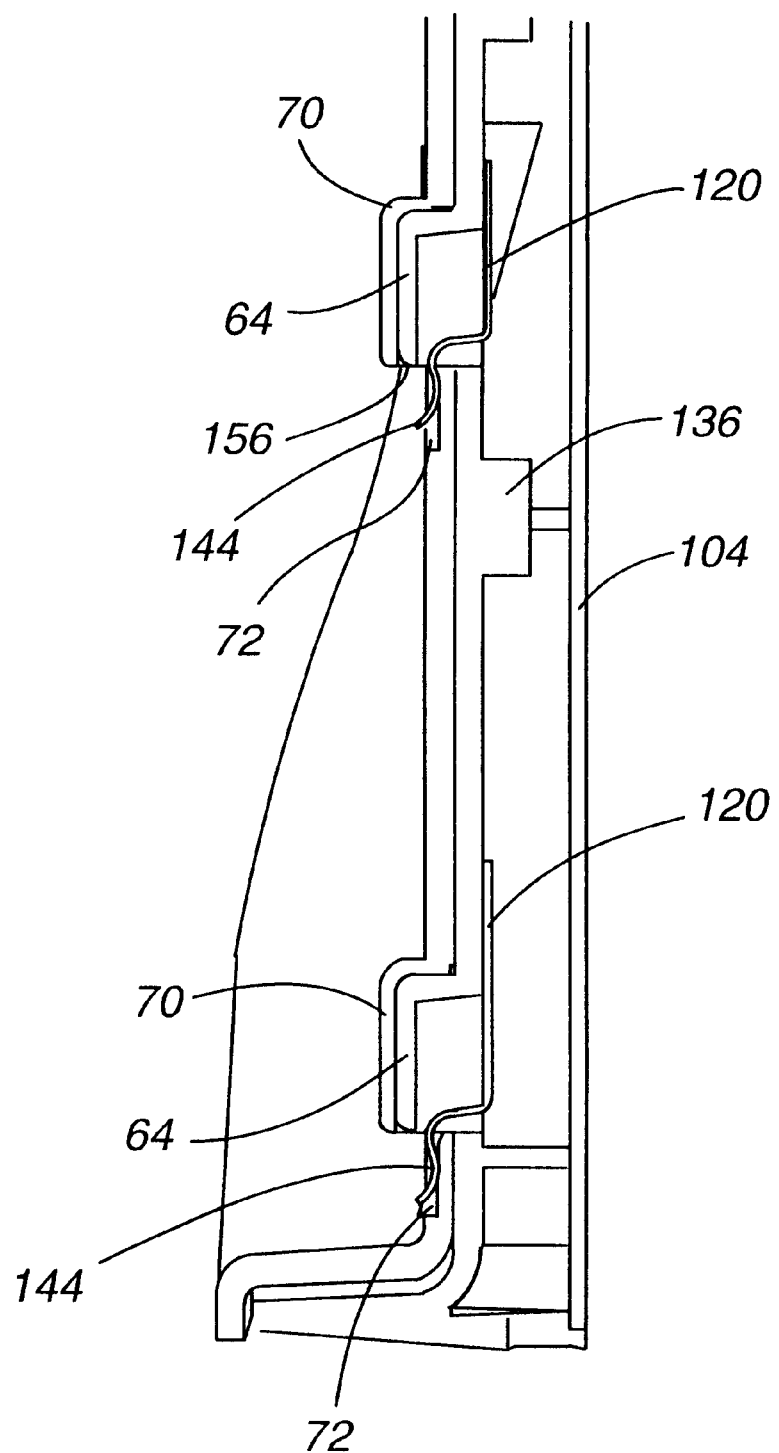
FIG. 15 is a partial cross-sectional view of an embodiment of a pocket member and an interface module of the present invention, further showing offset latch tabs.

In the preferred embodiment, because each latch tab 144 is slightly offset from the others relative to the plane of the latch plate 120, they engage the channels 72 consecutively rather than simultaneously. In this way, less force needs to be applied to fully engage the latch tabs 144 with the channels 72 and to lock the pocket member 14 to the interface module 16 (FIG. 15). Moreover, the plate spring 122 only has to have sufficient force to move the latch plate 120 to the locked position. Once the latch plate 120 and latch tabs 144 are in the locked position, the latch tabs 144 maintain the engagement between the pocket member 14 and interface module 16. Indeed, the latch tabs 144 are designed and configured to draw the pocket member into the interface module and substantially eliminate any manufacturing tolerances which would cause either component to move relative to the other. The fact that the latch tabs 144 are offset in the preferred embodiment also allows the latching mechanism 94 to eliminate manufacturing tolerances. It will also be observed that the latch tabs 144 have a curved profile. This shape enhances the ability of the latch tabs 144 to secure the pocket member 14 to the interface module 16, although persons of skill in the art will appreciate different shapes that can be utilized. In addition, the latch tabs 144 are designed with sufficient resiliency that should the pocket member be physically pulled from the interface module without disengaging the latching mechanism, overcoming the safety force designed to hold the two components together, the latch tabs will return to their normal shape and continue to function properly.

Figure 16:
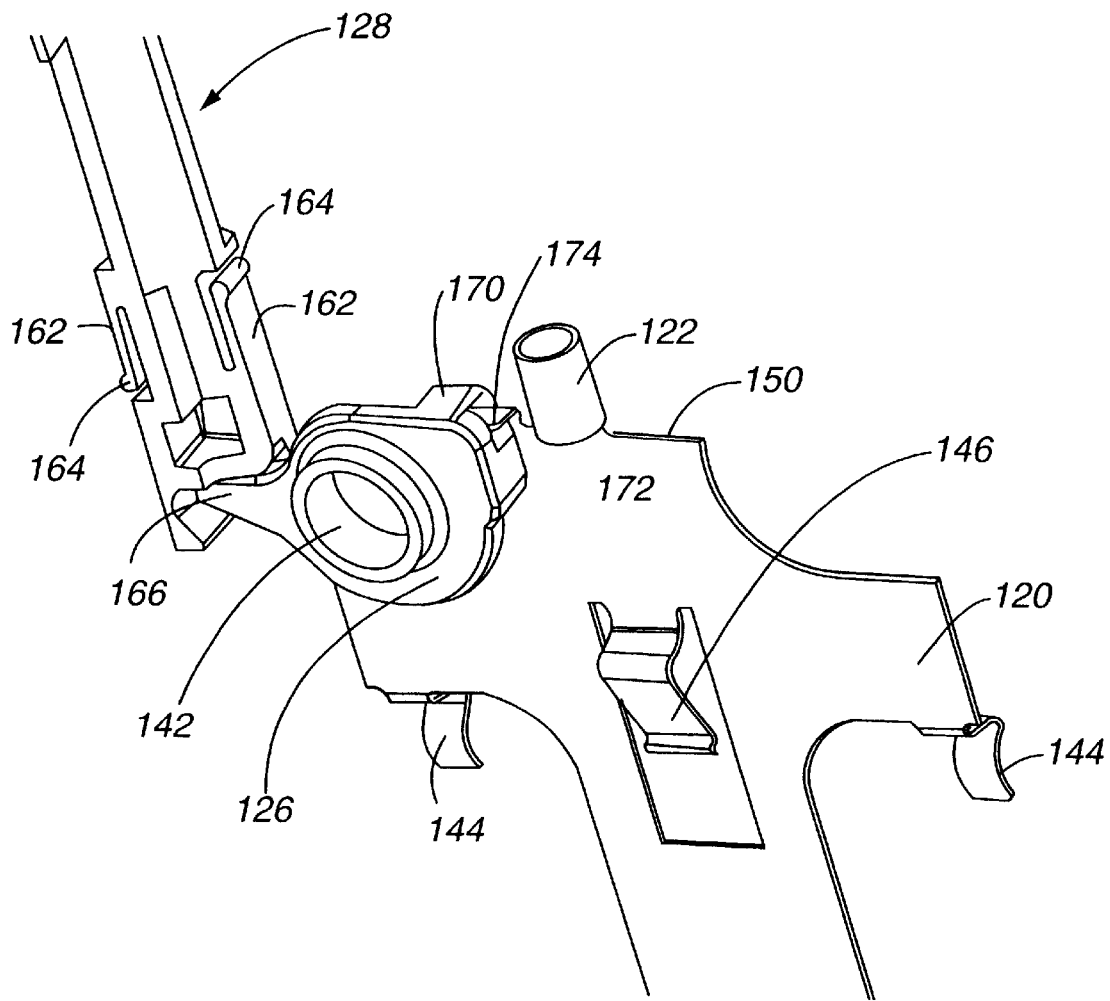
FIG. 16 is a partial rear view of an embodiment of the release mechanism of the present invention for releasing the latching mechanism of an interface module.
Figure 17:
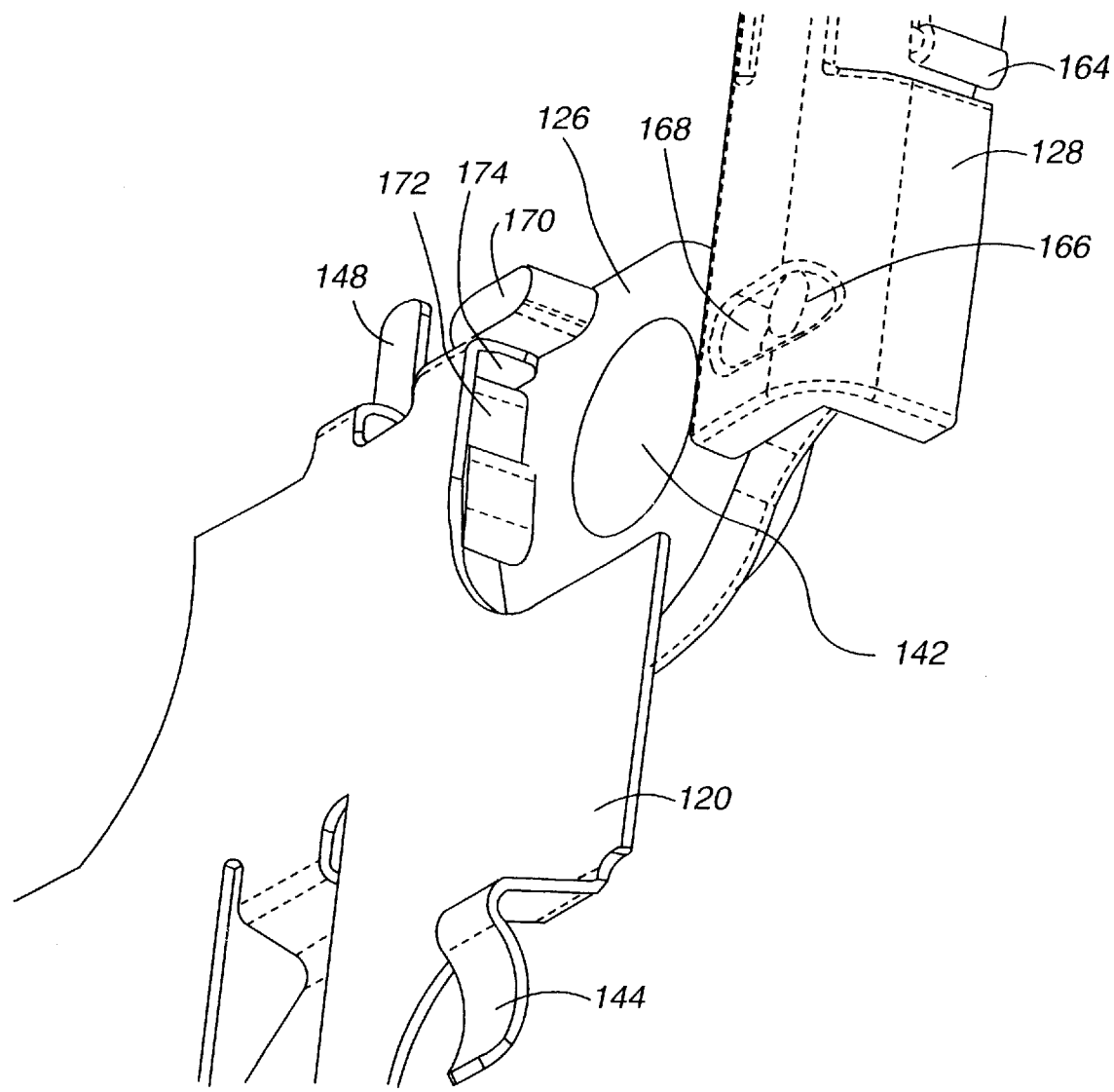
FIG. 17 is an enlarged partial front perspective view of an embodiment of the release mechanism of the present invention for releasing the latching mechanism of an interface module.

FIGS. 6, 7, 16 and 17 illustrate the various components that comprise the release mechanism for moving the locking mechanism 94 from the locked position to the unlocked position in order to disengage the pocket member 14 from the interface module 16. The release rod 128 slides along the side wall 158 of the rear shell 24 of the interface module 16 and within an aperture 160 formed by the front shell 22 and rear shell 24. A pair of outwardly biased springs 162, having enlarged ends 164, are formed in opposite sides of the release rod 128 and contact the inside surface 158 of the rear shell 24 to dampen any rattling of the release rod 128. As best seen in FIGS. 16 and 17, the release rod 128 is attached to the lever 126 by a pin 166 positioned at one end of the lever 126. The pin 166 sits in a slot 168 formed in the base of the release rod 126. The lever 126 has a central aperture 142 which allows it to pivot about one of the posts 136 formed on the inside surface of the front shell 22 of the interface module 16. Also mounted to the lever body 126, opposite the pin 166, are a pair of posts 170 and 172 with a gap formed between them. A release flange 174 formed along the upper edge of the latch plate 120 is positioned in the gap between the posts 170 and 172 when the interface module 16 is assembled (see FIGS. 16 and 17).

To move the latch plate 120 and disengage the latching mechanism 94 from the pocket member 14, the release rod 128 is pressed. This action causes the lever 126 to rotate about the post 136, which in turn forces the lower post 172 to engage the release flange 174 and move the latch plate 120 to the unlocked position. Because the release tab 146 is biased toward the release tab shelf 154, when the release tab 146 is adjacent the shelf 154, the release tab 146 will move into engagement with the shelf 154, will push the pin 90 out of the pin release hole 92, and secure the latch plate 120 in the unlocked position. This action will also cause the plate spring 122 to compress. By moving the latch plate 120 from the second (locked) position to the first (unlocked) position, the latch tabs 144 will retract from the channels 72 in the rear shell 20 of the pocket member 14 and into the protuberances 64 of the front shell 22 of the interface module 16 allowing the pocket member 14 to be removed from the interface module 14 with a limited, one-dimensional motion.

It should also be noted that the release rod 128 may have a hollow configuration for ventilation purposes. As a hollow member, it acts as a chimney, in combination with louvered vents 105, to remove heat from inside the interface module thereby cooling the internal electronic components.

As should be appreciated, the present invention provides a mounting and support system for portable phones which optimizes the space needed to achieve mounting. With a one-dimensional, limited motion the phone and pocket member can be attached to the interface module. Moreover, while an exemplary and preferred embodiment has been described, those having skill in the art will recognize various changes, modifications, additions and applications other than those expressly identified. Such changes, additions, modifications and additional applications are within the scope of the present invention.

What is claimed is:

1. An adaptor for hands-free operation of a portable phone, comprising:

an interchangeable pocket member having a receiving section and a mounting section, said receiving section adapted to receive a portable phone, said pocket member also having a latching mechanism to retain said portable phone in said receiving section, a first connector interfacing with the electronics of the portable phone, and a second connector interfacing with the electronics of an interface module;

an interface module having a receiving section configured to mate with said mounting section of said pocket member, a latching mechanism to retain said pocket member in said receiving section and a connector interfacing with said second connector of said pocket member, wherein said interchangeable pocket member is received and removed from said receiving section of said interface module by movement of said pocket member in a substantially single dimension, and continued movement of said pocket member toward said interface module in said substantially single dimension mechanically and electronically interconnects said pocket member and said interface module.

2. The adaptor of claim 1, wherein said pocket member and said interface module include complementary registration members for aligning said mounting section of said pocket member with said receiving section of said interface module.

3. The adaptor of claim 1, further comprising a latching mechanism which secures said pocket member to said interface module and which is activated by movement of said pocket member relative to said interface module.

4. The system of claim 1, wherein said interface module further includes a memory device for receiving and storing data input.

5. The system of claim 1, wherein said pocket member further includes a memory device for receiving and storing data input.

6. The system of claim 5, wherein said data input can be in the form of an analog signal, a digital signal or sound waves.

7. The system of claim 1, wherein said interface module is disposed within a vehicle and interconnects the portable electronic device to the audio system of the vehicle to provide enhanced audio capabilities to the user.

8. The system of claim 1, wherein said interface module is disposed within a vehicle and interconnects the portable electronic device to a microphone.

9. An adaptor for hands-free operation of a portable phone, comprising:

a pocket member having a receiving section and a mounting section, said receiving section disposed on the front of said pocket member and adapted to receive a portable phone, a first latching mechanism disposed within said pocket member to secure the portable phone within said receiving section, said mounting section disposed on the back of said pocket member and having a plurality of apertures for engagement with second latching mechanism in an interface module, a first connector interfacing with the electronics of the interface module, and a second connector interfacing with the electronics of the portable phone;

an interface module having a receiving section disposed on the front of said interface module and configured to mate with said mounting section of said pocket member, a second latching mechanism independent of said first latching mechanism to retain said pocket member in said receiving section and movable between a first position in which the pocket member is engaged by said latching mechanism, and a second position in which said pocket member is not engaged by said latching mechanism and comprising a plurality of latch members disposed for alignment with said apertures of said mounting section of said pocket member when said pocket member is mated with said interface module, and a connector interfacing with said first connector of said pocket member;

wherein when said mounting section of said pocket member is seated within said receiving section of said interface module said latch members extend through said apertures and move from said first position to said second position to secure said interface module to said pocket member.

10. The adaptor of claim 9, further comprising a memory device within said pocket member for recording voice input.

11. The interface module of claim 9, further comprising a spring member for biasing said latching mechanism toward said first position.

12. The interface module of claim 9, further comprising a release mechanism for holding said latching mechanism in said second position.

13. The adaptor of claim 12, wherein said latching mechanism is resilient such that said pocket member can be removed from said interface module without activation of said release mechanism and said latching mechanism will still function to latch said pocket member to said interface module.

14. The interface module of claim 12, further comprising an engagement member for engaging said release mechanism and retaining said latching mechanism in said second position.

15. The interface module of claim 14, wherein said release mechanism comprises a release tab and a shelf member.

16. The interface module of claim 9, further comprising a release mechanism for moving said latching mechanism from said first position to said second position.

17. The adaptor of claim 9, wherein said pocket member and said interface module include complementary registration members for aligning said mounting section of said pocket member within said receiving section of said interface module.

18. The adaptor of claim 9, wherein said latching mechanism includes at least one latch tab which is disposed within said interface module when said latching mechanism is in the first position and which engages said pocket member when said latching mechanism is in the second position.

19. The adaptor of claim 18, wherein said latching mechanism comprises a plurality of latch tabs and at least one latch tab is positionally offset from another latch tab.

20. The adaptor of claim 19, wherein said plurality of latch tabs are configured to overcome manufacturing tolerances and mechanically secure said pocket member to said interface module.

21. The adaptor of claim 9, wherein said pocket member connects with said interface module by a limited, one-dimensional movement of either said pocket member or said interface module relative to the other.

22. The adaptor of claim 9, wherein said latching mechanism precludes rotational engagement or disengagement of said pocket member and said interface module, thereby protecting the electrical connection between said pocket member and said interface module.

23. An adaptor for hands-free operation of a portable electronic device with electronics for voice and/or data communications within a vehicle, comprising:

a pocket member having a receiving section and a mounting section, said receiving section adapted to receive said portable electronic device, said pocket member also having a latching mechanism to retain said portable electronic device in said receiving section, and a first connector interfacing with the electronics of the portable electronic device, and a second connector moveable in two dimensions and interfacing with the electronics of the interface module; and, an interface module mounted to said vehicle, said interface module having a receiving section configured to mate with said mounting section of said pocket member, a latching mechanism to retain said pocket member in said receiving section, and a connector electronically interfacing with said second connector of said pocket member and with systems resident within the vehicle;

wherein when a portable electronic device is secured to said pocket member said first connector is moveable to facilitate interconnection with the personal electronic device and to facilitate interconnection with said second connector when said pocket member is secured to said interface module.

24. The adaptor of claim 23, wherein the portable electronic device can receive power from the power system of the vehicle for purposes of operating the portable electronic device or charging a battery within the portable electronic device.

25. The adaptor of claim 23, further including ventilation means associated with at least said interface module for allowing air flow in and out of said interface module.

26. The adaptor of claim 25, wherein said ventilation means includes air vents disposed in the body of said interface module.

27. The adaptor of claim 25, wherein said latching member includes a latch release member disposed proximate the external surface of said interface module and said ventilation means includes an air passage adjacent said latch release member.

28. The adaptor of claim 23, wherein said portable electronic device includes a portable phone.

29. The adaptor of claim 23, wherein said mounting section of said pocket member and said receiving section of said interface module align the electrical connectors that provide electrical connection between said pocket member and said interface module.

30. The adaptor of claim 23, wherein said receiving section of said interface module includes a raised portion which interfaces with said pocket member to facilitate alignment between said pocket member and said interface module and to control activation of said latching mechanism of said interface module.

31. An adaptor for hands-free operation of a portable phone, comprising:

a pocket member having a height that defines a first axis, a width that defines a second axis and a depth that defines a third axis with each of said three axes being perpendicular to the other two axes, said pocket member including a receiving section and a mounting section, said receiving section adapted to receive a portable phone, said pocket member also having a latching mechanism to retain the portable phone in said receiving section, a first connector interfacing with the electronics of the interface module and a second connector interfacing with the electronics of the portable phone;

an interface module, separate from said pocket member and having a receiving section configured to mate with said mounting section of said pocket member upon movement of said pocket member in a direction substantially parallel to said third axis, a latching mechanism, independent of said latching mechanism of said pocket member, to retain said pocket member in said receiving section and a connector interfacing with said first connector of said pocket member, wherein the portable phone is seated within said receiving section of said pocket member by movement of the portable phone in at least in a direction substantially parallel to said first axis and said pocket member is received and removed from said receiving section of said interface module by movement of said pocket member in a direction substantially parallel to said third axis.

32. The adapter of claim 31, wherein said latching mechanism of said interface module moves between a first position wherein said pocket member is not secured to said interface module and a second position in which said pocket member is secured to said interface module and the direction of movement of said latching mechanism is in a direction substantially parallel to said second axis.

33. A system of interchangeable adaptors for hands-free operation of a portable phone, comprising:

a plurality of pocket members each having a receiving section and a mounting section, said receiving section adapted to receive a portable phone of a particular configuration, said pocket member also having a latching mechanism to retain the portable phone in said receiving section, a first connector interfacing with the electronics of the portable phone, and a second connector interfacing with the electronics of an interface module;

an interface module having a receiving section configured to mate with said mounting section of said pocket member, a latching mechanism to retain said pocket member in said receiving section and a connector interfacing with said second connector of said pocket member;

wherein said pocket members are removable from said interface module such that portable phones having different configurations interface with a single interface module.

34. The system of claim 33 wherein said pocket members are received and removed from said receiving section of said interface module by movement of said pocket member in a substantially single dimension, and continued movement of said pocket member toward said interface module in said substantially single dimension mechanically and electronically interconnects said pocket member and said interface module.

35. The adaptor of claim 33, wherein said pocket member and said interface module include complementary registration members for aligning said mounting section of said pocket member with said receiving section of said interface module.

36. The adaptor of claim 33, further comprising a latching mechanism which secures said pocket member to said interface module and which is activated by movement of said pocket member relative to said interface module.

37. A system of interchangeable adaptors for use with a variety of personal electronic devices, said system comprising:

a plurality of pocket members, each having a receiving section and a mounting section, said receiving section adapted to receive personal electronic devices of a particular configuration; said pocket members also having a latching mechanism to retain said particular personal electronic device in said receiving section, and a connector interfacing with the electronics of said particular personal electronic device;

an interface module having a receiving section configured to mate with said mounting section of said pocket member, a latching mechanism to retain said pocket member in said receiving section and an electronic connector interfacing with the connector of said pocket member;

wherein said pocket members are removable from said interface module such that personal electronic devices having different configurations interface with a single interface module.

38. The system of claim 37, wherein said personal electronic devices comprise one or more of the group comprising portable phones, portable computers, personal data assistants and wireless data terminals.

39. The adaptor of claim 37, wherein said pocket member and said interface module include complementary registration members for aligning said mounting section of said pocket member with said receiving section of said interface module.

40. The adaptor of claim 37, further comprising a latching mechanism which secures said pocket member to said interface module and which is activated by movement of said pocket member relative to said interface module.

41. An adaptor for hands-free operation of a portable phone, comprising:

a pocket member having a receiving section and a mounting section, said mounting section disposed on the back of said pocket member, said receiving section disposed on the front of said pocket member and adapted to receive a portable phone, a first latching mechanism disposed within said pocket member to secure the portable phone within said receiving section, a first connector interfacing with the electronics of the portable phone and a second connector interfacing with the electronics of an interface module;

an interface module having a receiving section disposed on the front of said interface module and configured to mate with said mounting section of said pocket member, and a connector interfacing with said second connector of said pocket member;

a second latching mechanism independent of said first latching mechanism and movable between a first position in which said pocket member and said interface module are disconnected and a second position in which said pocket member and said interface module are engaged by said latching mechanism, said second latching mechanism comprising a plurality of latch members;

wherein when said mounting section of said pocket member is seated within said receiving section of said interface module said latch members move from said first position to said second position to secure said interface module to said pocket member.

42. The adaptor of claim 41, wherein said second latching mechanism is disposed in said interface module.

43. The adaptor of claim 42, further comprising a plurality of apertures disposed in said pocket member, and when said second latching mechanism moves from said first position to said second position, said latch members extend through said apertures and said pocket member is secured to said interface module.

44. The adaptor of claim 41, wherein said second latching mechanism is disposed in said pocket member.

45. The adaptor of claim 44, further comprising a plurality of apertures disposed in said interface module, and when said second latching mechanism moves from said first position to said second position, said latch members extend through said apertures and said pocket member is secured to said interface module.

46. An adaptor for hands-free operation of a portable phone, comprising:

a pocket member having a receiving section and a mounting section, said receiving section adapted to receive a portable phone, said pocket member also having a latching mechanism to retain said portable phone in said receiving section, a first connector interfacing with the electronics of the portable phone and a second connector interfacing with the electronics of an interface module;

an interface module having a receiving section configured to mate with said mounting section of said pocket member, a latching mechanism to retain said pocket member in said receiving section and a connector interfacing with said second connector of said pocket member, wherein said pocket member is removable from said receiving section of said interface module allowing a second pocket member containing a second portable phone to mate with said interface module by movement of said pocket member in a substantially single dimension.

* * * * *

(12) INTER PARTES REEXAMINATION CERTIFICATE (0265th)
United States Patent
Poplawsky et al.

(10) Number: US 6,341,218 C1
(45) Certificate Issued: May 31, 2011

(54) SUPPORTING AND CONNECTING A PORTABLE PHONE

(75) Inventors: Ralph C. Poplawsky, Littleton, CO (US); Kathryn D. Delianides, Boulder, CO (US); James T. Wilkinson, Highlands Ranch, CO (US)

(73) Assignee: Cellport Systems, Inc., Boulder, CO (US)

Reexamination Request:
No. 95/000,102, Jul. 28, 2005

Reexamination Certificate for:
Patent No.: 6,341,218
Issued: Jan. 22, 2002
Appl. No.: 09/454,506
Filed: Dec. 6, 1999

(51) Int. Cl.
*B60R 11/00* (2006.01)
*B60R 11/02* (2006.01)
*H04B 1/38* (2006.01)
*H04M 1/04* (2006.01)
*H04M 1/60* (2006.01)

(52) U.S. Cl. .......... 455/569.1; 455/351; 379/420.01; 379/420.04; 379/428.01; 379/433.01

(58) Field of Classification Search .......... None
See application file for complete search history.

(56) References Cited

U.S. PATENT DOCUMENTS

| | | |
|---|---|---|
| 4,607,170 A | 8/1986 | Wickman |
| 4,622,633 A | 11/1986 | Ceccon et al. |
| 4,672,570 A | 6/1987 | Benken |
| 4,694,421 A | 9/1987 | Ogawa |
| 4,697,281 A | 9/1987 | O'Sullivan |
| 4,700,375 A | 10/1987 | Reed |
| 4,718,080 A | 1/1988 | Serrano et al. |
| 4,748,685 A | 5/1988 | Rozanski |
| 4,771,448 A | 9/1988 | Koohgoli et al. |
| 4,782,526 A | 11/1988 | Uchino et al. |
| 4,792,986 A | 12/1988 | Garner et al. |
| 4,804,937 A | 2/1989 | Barbiaux et al. |
| 4,837,800 A | 6/1989 | Freeburg et al. |
| 4,873,711 A | 10/1989 | Roberts et al. |

(Continued)

FOREIGN PATENT DOCUMENTS

| | | |
|---|---|---|
| CA | 2147370 | 4/1994 |
| DE | 4107995 A1 | 3/1991 |
| DE | 4026817 A1 | 2/1992 |

(Continued)

OTHER PUBLICATIONS

Coviello et al., "Conceptual Approaches to Switching in Future Military Networks", pp. 1491–1498, IEEE Transactions on Communications, vol. Com–28, No. 9, Sep. 1980.

(Continued)

*Primary Examiner* — Margaret Rubin

(57) ABSTRACT

An adaptor for supporting and connecting a portable electronic device, such as a portable phone, computer or other wireless communication device. The adaptor includes a pocket member and an interface module. The portable phone mechanically and electrically connects to the pocket member, and the pocket member mechanically and electrically connects to the interface module. The mechanical and electrical connections between the pocket member and the interface module are common between any interface module and any pocket member. In contrast, the receiving section of the pocket member is varied between different pocket members to accommodate portable electronic devices having different physical constructions. The pocket member attaches to the interface module with a limited, one-dimensional movement of the pocket member relative to the interface module to optimize use of space, particularly in vehicles. The pocket member and interface module may further include electrical components to enhance the functionality of the portable electronic device and the safety in operating the portable electronic device while driving by providing hands-free operation of the portable electronic device in addition to hands-free voice and data communication.

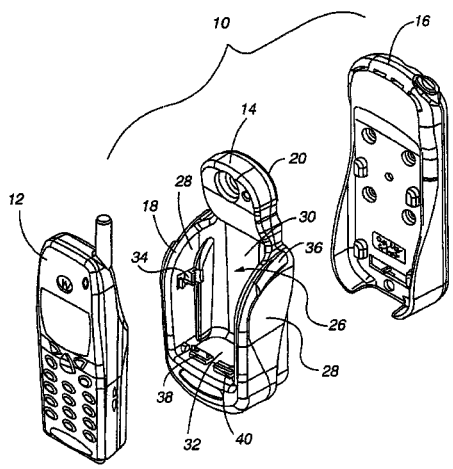

U.S. PATENT DOCUMENTS

| | | |
|---|---|---|
| 4,876,710 A | 10/1989 | Reed et al. |
| 4,876,712 A | 10/1989 | Brint et al. |
| 4,890,315 A | 12/1989 | Bendixen et al. |
| 4,933,964 A | 6/1990 | Girgis |
| 4,939,770 A | 7/1990 | Makino |
| 4,953,198 A | 8/1990 | Daly et al. |
| 4,972,457 A | 11/1990 | O'Sullivan |
| 4,972,470 A | 11/1990 | Farago |
| 4,977,609 A | 12/1990 | McClure |
| 4,989,230 A | 1/1991 | Gillig et al. |
| 4,991,085 A | 2/1991 | Pleva et al. |
| 5,020,090 A | 5/1991 | Morris |
| 5,023,905 A | 6/1991 | Wells et al. |
| 5,029,233 A | 7/1991 | Metroka |
| 5,046,187 A | 9/1991 | Takahashi |
| 5,048,117 A | 9/1991 | Aisaka et al. |
| 5,054,115 A | 10/1991 | Sawa et al. |
| 5,081,667 A | 1/1992 | Drori et al. |
| 5,082,667 A | 1/1992 | Van Scoik |
| 5,095,480 A | 3/1992 | Fenner |
| 5,095,503 A | 3/1992 | Kowalski |
| 5,109,402 A | 4/1992 | Anderson et al. |
| 5,119,397 A | 6/1992 | Dahlin et al. |
| 5,127,041 A | 6/1992 | O'Sullivan |
| 5,127,042 A | 6/1992 | Gillig et al. |
| 5,146,486 A | 9/1992 | Lebowitz |
| 5,148,473 A | 9/1992 | Freeland et al. |
| 5,164,652 A | 11/1992 | Johnson et al. |
| 5,189,358 A | 2/1993 | Tomura et al. |
| 5,189,734 A | 2/1993 | Bailey et al. |
| 5,199,397 A | 4/1993 | Shelef et al. |
| 5,203,012 A | 4/1993 | Patsiokas et al. |
| 5,212,722 A | 5/1993 | Murata |
| 5,214,774 A | 5/1993 | Welsch et al. |
| 5,237,570 A | 8/1993 | Smolinske et al. |
| 5,243,640 A | 9/1993 | Hadley et al. ................. 379/59 |
| 5,259,018 A | 11/1993 | Grimmett et al. |
| 5,260,988 A | 11/1993 | Schellinger et al. |
| 5,274,837 A | 12/1993 | Childress et al. |
| 5,276,703 A | 1/1994 | Budin et al. |
| 5,280,229 A | 1/1994 | Faude et al. |
| 5,287,541 A | 2/1994 | Davis et al. |
| 5,289,378 A | 2/1994 | Miller et al. |
| 5,297,142 A | 3/1994 | Paggeot et al. |
| 5,301,359 A | 4/1994 | Van den Heuvel et al. |
| 5,307,413 A | 4/1994 | Denzer |
| 5,327,481 A | 7/1994 | Horimoto |
| 5,331,634 A | 7/1994 | Fischer |
| 5,331,635 A | 7/1994 | Ota |
| 5,333,177 A | 7/1994 | Braitberg et al. |
| 5,347,272 A | 9/1994 | Ota |
| 5,353,331 A | 10/1994 | Emery et al. |
| 5,361,985 A | 11/1994 | Rein et al. |
| 5,367,558 A | 11/1994 | Gillig et al. |
| 5,371,734 A | 12/1994 | Fischer |
| 5,408,684 A | 4/1995 | Yunoki et al. |
| 5,422,934 A | 6/1995 | Massa |
| 5,428,636 A | 6/1995 | Meier |
| 5,437,053 A | 7/1995 | Sawa et al. |
| 5,442,633 A | 8/1995 | Perkins et al. |
| 5,450,471 A | 9/1995 | Hanawa et al. |
| 5,459,660 A | 10/1995 | Berra |
| 5,463,674 A | 10/1995 | Gillig et al. |
| 5,469,469 A | 11/1995 | Haines |
| 5,475,864 A | 12/1995 | Hamabe |
| 5,475,868 A | 12/1995 | Duque-Anton et al. |
| 5,479,479 A | 12/1995 | Braitberg et al. |
| 5,491,690 A | 2/1996 | Alfonsi et al. |
| 5,491,693 A | 2/1996 | Britton et al. |
| 5,506,887 A | 4/1996 | Emery et al. |
| 5,506,888 A | 4/1996 | Hayes et al. |
| 5,509,123 A | 4/1996 | Dobbins et al. |
| 5,513,107 A | 4/1996 | Gormley |
| 5,513,379 A | 4/1996 | Benveniste et al. |
| 5,515,043 A | 5/1996 | Berard et al. |
| 5,519,621 A | 5/1996 | Wortham |
| 5,519,884 A | 5/1996 | Duque-Anton et al. |
| 5,526,404 A | 6/1996 | Wiedeman et al. |
| 5,530,701 A | 6/1996 | Stillman et al. |
| 5,533,099 A | 7/1996 | Byrne |
| 5,535,247 A | 7/1996 | Gailus et al. |
| 5,535,274 A | 7/1996 | Braitberg et al. ............ 379/446 |
| 5,544,222 A | 8/1996 | Robinson et al. |
| 5,551,066 A | 8/1996 | Stillman et al. |
| 5,561,836 A | 10/1996 | Sowles et al. |
| 5,564,070 A | 10/1996 | Want et al. |
| 5,566,173 A | 10/1996 | Steinbrecher |
| 5,586,168 A | 12/1996 | Bucalo et al. |
| 5,594,718 A | 1/1997 | Weaver et al. |
| 5,594,943 A | 1/1997 | Balachandran |
| 5,610,972 A | 3/1997 | Emery et al. |
| 5,630,061 A | 5/1997 | Richter et al. |
| 5,636,371 A | 6/1997 | Yu |
| 5,649,308 A | 7/1997 | Andrews |
| 5,673,322 A | 9/1997 | Pepe et al. |
| 5,708,707 A | 1/1998 | Halttunen et al. |
| 5,710,908 A | 1/1998 | Man |
| 5,717,737 A | 2/1998 | Doviak et al. |
| 5,732,074 A | 3/1998 | Spaur et al. |
| 5,732,216 A | 3/1998 | Logan et al. |
| 5,752,193 A | 5/1998 | Scholefield et al. |
| 5,774,793 A | 6/1998 | Cooper et al. |
| 5,778,189 A | 7/1998 | Kimura et al. |
| 5,797,088 A | 8/1998 | Stamegna et al. |
| 5,802,467 A | 9/1998 | Salazar et al. |
| 5,809,415 A | 9/1998 | Rossmann |
| 5,809,437 A | 9/1998 | Breed |
| 5,822,427 A | 10/1998 | Braitberg et al. |
| 5,825,874 A | 10/1998 | Humphreys et al. |
| 5,826,188 A | 10/1998 | Tayloe et al. |
| 5,839,919 A | 11/1998 | Chen |
| 5,844,473 A | 12/1998 | Kaman |
| 5,856,976 A | 1/1999 | Hirano |
| 5,867,794 A | 2/1999 | Hayes et al. |
| 5,890,315 A | 4/1999 | Norton |
| 5,903,850 A | 5/1999 | Huttunen et al. |
| 5,999,094 A | 12/1999 | Nilssen |
| 6,009,168 A | 12/1999 | Snyder et al. |
| 6,023,232 A | 2/2000 | Eitzenberger |
| 6,036,071 A | 3/2000 | Hartmann et al. |
| 6,052,603 A | 4/2000 | Kinzalow et al. |
| 6,091,611 A | 7/2000 | Lanni |
| 6,122,514 A | 9/2000 | Spaur et al. |
| 6,138,041 A | 10/2000 | Yahia |
| 6,198,947 B1 | 3/2001 | Barber |
| 6,226,497 B1 | 5/2001 | Güntzer et al. |
| 6,269,258 B1 | 7/2001 | Peiker |
| 6,349,223 B1 | 2/2002 | Chen |
| 6,377,825 B1 | 4/2002 | Kennedy et al. |
| 6,516,192 B1 | 2/2003 | Spaur et al. |

FOREIGN PATENT DOCUMENTS

| | | | |
|---|---|---|---|
| DE | 410 7995 | * | 9/1992 |
| DE | 69321858 T2 | | 3/1993 |
| DE | 19631444 | | 3/1997 |
| DE | 296 16 889 U1 | | 3/1997 |
| DE | 196 31 444 A1 | | 8/1998 |
| DE | 196 31 444 | * | 8/1998 |
| DE | 29616889 | | 8/1998 |
| EP | 0300200 A2 | | 6/1988 |
| EP | 0435664 A2 | | 12/1990 |

| | | |
|---|---|---|
| EP | 0449471 A2 | 3/1991 |
| EP | 0455252 A2 | 5/1991 |
| EP | 0501058 A2 | 6/1991 |
| EP | 0494780 A2 | 1/1992 |
| EP | 0472044 A3 | 10/1992 |
| EP | 0472044 A2 | 10/1992 |
| EP | 0670095 B1 | 10/1992 |
| EP | 0559187 A1 | 3/1993 |
| EP | 0617535 A2 | 3/1994 |
| EP | 0699361 B1 | 4/1994 |
| EP | 0760188 B1 | 4/1995 |
| EP | 0822693 A2 | 2/1998 |
| EP | 0920170 A2 | 11/1998 |
| FR | 2674399 A3 | 9/1992 |
| FR | 2721766 A1 | 6/1994 |
| GB | 2264613 A | 9/1993 |
| GB | 2305066 A | 3/1997 |
| JP | 62-168430 | 7/1987 |
| JP | 64-085431 | 9/1987 |
| JP | 62-197033 | 12/1987 |
| JP | 63-309822 | 12/1988 |
| JP | 1-503271 | 2/1989 |
| JP | 01-87847 | 6/1989 |
| JP | 01-175323 | 12/1989 |
| JP | 2-720242 | 6/1990 |
| JP | 04-266228 | 2/1991 |
| JP | 03128558 A | 5/1991 |
| JP | 03-196723 | 8/1991 |
| JP | 03-085949 | 11/1991 |
| JP | 04-002472 | 1/1992 |
| JP | 04-28335 | 3/1992 |
| JP | 04174985 A | 6/1992 |
| JP | 04-267079 | 9/1992 |
| JP | 042597744 A | 9/1992 |
| JP | 04-331543 | 11/1992 |
| JP | 05-252106 | 9/1993 |
| JP | 10194052 A | 7/1998 |
| WO | WO 89/03624 | 4/1984 |
| WO | WO 91/02424 | 2/1991 |
| WO | WO 93/24911 | 12/1993 |
| WO | WO 94/24775 | 10/1994 |
| WO | WO 95/28789 | 10/1995 |
| WO | WO 95/31060 | 11/1995 |
| WO | WO 97/03512 | 1/1997 |
| WO | WO 97/13332 | 4/1997 |
| WO | WO 97/25223 A1 | 7/1997 |
| WO | WO 97/26750 | 7/1997 |
| WO | WO 98/40244 A1 | 9/1998 |
| WO | WO 98/57434 | 12/1998 |
| WO | WO 99/17477 | 4/1999 |
| WO | WO 99/22301 | 5/1999 |
| WO | WO 01/41484 A1 | 6/2001 |
| WO | WO 01/61875 A1 | 8/2001 |

OTHER PUBLICATIONS

Morrison A. Dempsey Communications, "AB3X Cellular Interface" Owner's Manual, Nov. 1987, 30 pages.

Hansen, Paul, "Online Onboard: Personal Computing, Speech and the Internet in the Vehicle", Nov. 1998.

Bosch, Robert "CAN Specification 2.0", 1991.

Cellport, "CellPort MSC–9710 MobileWeb Developer's Kit", rev Feb. 97.

Rosato, Donna, "The Internet on flights may fly", USA Today, Dec. 13, 1995.

Pascoe, R., The Salutation Consortium, "Geographic Computing: Enabling New Markets for Hand Held and Palm–Size Information Appliances: A Salutation White Paper," pp. 1–11 (Dec. 16, 1998).

Internet Week, "Vehicle–Based Web Servers Find Applications, MobileWeb Brings Intranet Benefits to Mobile Data", Apr. 15, 1996.

The Hansen Report on Automotive Electronics, "Powerful New Carmaker Consortium to Create Standard Multimedia Interfaces" vol. 11, No. 8, Oct. 1998.

Telematics Suppliers Consortium, "Telematics Suppliers Consortium Formed to Define Telematics Standards", news release, Oct. 19, 1998.

Summary Systems, company profile, Dec. 1, 1998, available at www.summarysystems.com.

Fuchs, Axel et al., "Next Generation Portable Devices", Telematics Update, Dec. 2003–Jan. 2004, Issue 25.

Margolin, Bob, "Smarter Stuff: Embedded Processors are waking up, and they're increasingly accessible and controllable by networks and the internet." Byte, Jun. 1997.

Perkins, Charles, "Mobile IP", IEEE Communication Magazine, May 1997.

Symbol, "Symbol Mobile Gateway", product brochure, 1996, www.symbol.com.

Cellport, "Wireless Connectivity and Mobile Networking", product brochure, 1996.

Kennedy, Pat, "Cellport Labs announces enhanced design of universal car kit and an additional patent award", news release, Sep. 9, 1996.

Blake, Jerry, "Cellport develops in vehicle internet data transfer connection", RCR Mar. 4, 1996, p. 10.

Simon from Bell South, "Simon Says . . . ", product brochure, 1993.

Kobayashi, Toshiaki, "Mobile Telephone for Cellular System", OKI Technical Review, vol. 56, Apr. 1989.

Kennedy, Pat, "Developing the Interactive Car", Mobile Communications International, Issue 27 Dec. 1995–Jan. 1996.

Helm, Leslie, "Wireless Car on the Horizon" L.A. Times, Nov. 1, 1995.

"Cellport to Develop Wireless Interface with Automobile Applications", Global Positioning and Navigation News, Nov. 2, 1995.

Wireless Data News, "AT&T Invests in Colorado Company's Automotive LAN Technology Development Project", Nov. 1, 1995.

Strong, Michael, "'Smart' Phone Gives Drivers Safety Sense", Monday Morning Newspapers, Nov. 6, 1995.

Advanced Transportation Technology News, "CellPort Networks Cars' Electronics", Nov. 1995.

Cellular Integration, "Cellular technology move into the driver's seat in the auto industry", Jan. 1996.

Keenan, Tim, "Missing Link: Jockeying for position in vehicle communications", Ward's Auto World, Jan. 1996.

Menezes, Bill, "AT&T buys CellPort stake", Rocky Mountain News, Oct. 24, 1995.

Wall Street Journal, "Wireless Services Acquires Stake in Car Technology", Oct. 24, 1995.

Keating, Stephen, "AT&T Wireless Buys Stake . . .", Denver Post, Oct. 24, 1995.

Vittore, Vince, "Company hope 'smart car' can be a wireless data driver", America's Network, Nov. 15, 1995.

Seybold, Andrew, "October's News", Andrew Seybold's Outlook and Communications and Computing, Oct. 24, 1995.

PCT International Preliminary Examination Report for PCT Application No. PCT/US00/33315, Dec. 20, 2001 5 pages.

PCT Written Opinion for PCT Application No. PCT/US00/33315, Jan. 3, 2002, 5 pages.

Technology Update, "Make your cell phone 'hands-free' . . . in seconds!", Navigator Hands-Free Kit™ . . . of Comtrad Industries—undated.

Cellport, "Universal Handset connectivity system", product brochure, Jan. 2000, 8 pages.

European Examination Report for European Patent Application No. 00 982 526.6-1264, May 6, 2005, 7 pages.

European Search Report for European Patent Application No. 00 98 2526-1264, Sep. 30, 2004, 3 pages.

Meade, Peter, "'Rolling Web Site' a Hot Ticket on the Info Superhighway", America's Network, Mar. 1998, 1 page.

Metzger, John et al, "Wireless Pioneer Builds First Mobile Web Server", news release, Mar. 6, 1996, available at www.cellport.com, 3 pages.

PCT's search report for PCT Application No. PCT/US00/33315, Feb. 26, 2001, 1 page.

Rhoads, Christopher, "Cellphones Become 'Swiss Army Knives' as Technology Blurs", Wall Street Journal, Jan. 4, 2005, 2 pages.

The Automotive Multimedia Interface Consortium, "AMI Consortium Formed to Define Common Vehicle Access Standards", Oct. 19, 1998, 1 page.

Visteon, "ICES: Information, Communication, Entertainment, Safety and Security", product brochure, 1998, 3 pages.

* cited by examiner

US 6,341,218 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, line 62-column 8, line 15:

A further important feature is the mechanical latching mechanism between the pocket member 14 and the interface module 16. FIGS. 3 and 4 show the elements of the pocket member 14 which are involved in the universal or common mechanical connection between the pocket member 14 and the interface module 16. More specifically, in the preferred embodiment, four apertures 60 are formed in the rear wall 62 of the rear shell 20. These apertures 60 are designed to receive four protuberances 64 formed on the face 66 of the front shell 22 of the interface module 16 (see FIG. 5 ). The protuberances 64 are designed to fit in the apertures 60 and to restrict lateral and longitudinal movement of the pocket member 14 and interface module 16 relative to each other. As illustrated in FIG. 3, on the inside surface 68 of the rear shell 20 of the pocket member 14, each aperture 60 is covered on three sides by a cover or dome 70. As is also shown in FIG. 3, as well as in FIGS. 10 and 12-15, channels 72 are formed in the inside surface 68 of the rear shell 20 adjacent and below each aperture [64] *60*. The domes 70 are open along the bottom edge, as depicted in FIGS. 10 and 12, to provide access to channels 72.

Column 8, lines 46-63:

The receiving section 76 of the interface module 16 is also shown in FIGS. 5 and 6. The receiving station 76 includes a pair of raised flanges or side walls 96 which terminate at the lower portion of the interface module 16 to form a recess 98. The raised flanges 96 are configured to engage the side walls 84 of the raised body portion 78 of the pocket member 14 such that the body portion 78 of the pocket member 14 nests inside the flanges 96 of the interface module 16 and the top edge 100 of the flanges 96 abut the ridge 80 (see FIGS. 1 and 4). In addition, the base [portion] *member* 86 fits within the recess 98 such that the ridge 88 seats itself in the slot 102 formed in the outer surface 66 of the front shell 22 of the interface module 16. This alignment of the mounting section 74 of the pocket member 14 and the receiving section 76 of the interface module 16 further aligns the protuberances 64 with the apertures 60 and the 30 pin connector 44 and coaxial connector 46 with the matching 30 pin connector 52 and coaxial connector 56 in the interface module 16.

Column 9, line 66-column 10, line 10:

The inside surface 132 of the rear shell 24 has an inwardly extending hollow rear post 134 adjacent each aperture 130. Each aperture 130 in the front shell 22 similarly has an adjacent hollow front post 136 extending into the interface module 16. The rear posts 134 extend through four apertures 138 in the printed circuit board 104. The four front posts 136 extend around the latch plate 120, through the bushings 140 in the spacer 124, through an opening 142 in the rotating lever 126 and seat inside the rear posts 134. The spacer 124 separates the [latching mechanism] *latch plate* 120 from the printed circuit board 104 and secures the latching mechanism against the front shell 22.

Column 10, lines 30-50:

To activate the latching mechanism 94 and lock the interface module 16 to the pocket member 14, the latch plate 120 moves between a first and second position. In the first position or the unlocked position, the release tab 146 rests against the release tab shelf 154 and the protuberances 64 are seated inside the [recesses] *apertures* 60 and domes 70 of the pocket member 14 so that the latch tabs 144 are positioned adjacent and above the opening 156 in the protuberances 64. The latch plate 120 is moved to the second position, or the locked position, by the pin 90 extending into the pin release hole 92 as the pocket member 14 is moved into physical engagement with the interface module 16 (FIGS. 9 and 11). This limited, one-dimensional motion forces the release tab 146 off of the release tab shelf 154 (FIG. 11). When the release tab 146 is no longer engaged by the release tab shelf 154, the plate spring 122 forces the latch plate 120 downwardly as depicted in the Figures to a second or locked position. In moving to the second position, the latch tabs 144 move out of the openings 156 and engage the channels 72 in wall 68 of the rear section 20 of the pocket member 14 (FIGS. 10 and 12-14).

Column 10, lines 51-60:

Premature activation of the latching mechanism prior to the pocket member 14 being seated squarely in the interface module 16 is avoided because of the alignment provided by the mounting section 74, angled portion 75 and head portion 77 of the pocket member, the receiving section 76 and raised [portion] *surface* 79 of the interface module. Each of the involved members compel proper alignment of the pocket member relative to the interface module such that the protuberances 64 are fully positioned in the apertures 60 prior to the release pin 90 activating the [locking] *latching* mechanism 94.

Column 11, lines 22-44:

FIGS. 6, 7, 16 and 17 illustrate the various components that comprise the release mechanism for moving the [locking] *latching* mechanism 94 from the locked position to the unlocked position in order to disengage the pocket member 14 from the interface module 16. The release rod 128 slides along the side wall 158 of the rear shell 24 of the interface module 16 and within an aperture 160 formed by the front shell 22 and rear shell 24. A pair of outwardly biased springs 162, having enlarged ends 164, are formed in opposite sides of the release rod 128 and contact the inside surface 158 of the rear shell 24 to dampen any rattling of the release rod 128. As best seen in FIGS. 16 and 17, the release rod 128 is attached to the lever 126 by a pin 166 positioned at one end of the lever 126. The pin 166 sits in a slot 168 formed in the base of the release rod 126. The lever 126 has a central aperture 142 which allows it to pivot about one of the posts 136 formed on the inside surface of the front shell 22 of the interface module 16. Also mounted to the lever body 126, opposite the pin 166, are a pair of posts 170 and 172 with a gap formed between them. A release flange 174 formed along the upper edge of the latch plate 120 is positioned in the gap between the posts 170 and 172 when the interface module 16 is assembled (see FIGS. 16 and 17).

AS A RESULT OF REEXAMINATION, IT HAS BEEN DETERMINED THAT:

The patentability of claims 23-32 and 41-45 is confirmed.

Claims 1-8, 36-40 and 46 are cancelled.

Claims 9, 11, 12, 14-16, 33 and 35 are determined to be patentable as amended.

Claims 10, 13, 17-22 and 34, dependent on an amended claim, are determined to be patentable.

New claims 47 and 48 are added and determined to be patentable.

9. An adaptor for hands-free operation of a portable phone, comprising:
   a pocket member having a receiving section and a mounting section, said receiving section disposed on the front of said pocket member and adapted to receive a portable phone, a first latching mechanism disposed within said pocket member to secure the portable phone within said receiving section, said mounting section disposed on the back of said pocket member and having a plurality of apertures for engagement with second latching mechanism in an interface module, a first connector interfacing with the electronics of the interface module, and a second connector interfacing with the electronics of the portable phone;
   an interface module having a receiving section disposed on the front of said interface module and configured to mate with said mounting section of said pocket member, a second latching mechanism independent of said first latching mechanism to retain said pocket member in said receiving section and movable between a [first] *second* position in which the pocket member is engaged by said latching mechanism, and a [second] *first* position in which said pocket member is not engaged by said latching mechanism and comprising a plurality of latch members disposed for alignment with said apertures of said mounting section of said pocket member when said pocket member is mated with said interface module, and a connector interfacing with said first connector of said pocket member;
   wherein when said mounting section of said pocket member is seated within said receiving station of said interface module said latch members extend through said apertures and move from said first position to said second position to secure said interface module to said pocket member.

11. The [interface module] *adaptor* of claim 9, further comprising a spring member for biasing said latching mechanism *of said interface module* toward said first position.

12. The [interface module] *adaptor* of claim 9, further comprising a release mechanism for holding said latching mechanism *of said interface module* in said second position.

14. The [interface module] *adaptor* of claim 12, further comprising an engagement member for engaging said release mechanism and retaining said latching mechanism *of said interface module* in said second position.

15. The [interface module] *adaptor* of claim 14, wherein said release mechanism comprises a release tab and a shelf member.

16. The [interface module] *adaptor* of claim 9, further comprising a release mechanism for moving said latching mechanism *of said interface module* from said first position to said second position.

33. A system of interchangeable adaptors for hands-free operation of a portable phone, comprising:
   a plurality of pocket members each having a receiving section and a mounting section, said receiving section adapted to receive a portable phone of a particular configuration, said pocket member also having a latching mechanism to retain the portable phone in said receiving section, a first connector interfacing with the electronics of the portable phone, and a second connector interfacing with the electronics of an interface module, *wherein said mounting section includes side walls that form a ridge*;
   an interface module having a receiving section configured to mate with said mounting section of said pocket member, a latching mechanism to retain said pocket member in said receiving section and a connector interfacing with said second connector of said pocket member, *wherein said receiving section includes side walls that abut said ridge formed by said side walls of said mounting section of said pocket member when said mounting section of said pocket member is mated with said receiving section of said interface module*;
   wherein said pocket members are removable from said interface module such that portable phones having different configurations interface with a single interface module.

35. The [adaptor] *system* of claim 33, wherein said pocket member and said interface module include complementary registration members for aligning said mounting section of said pocket member with said receiving section of said interface module.

*47. The system of claim 33, wherein said ridge is curved.*

*48. The system of claim 33, wherein said side walls of said interface module comprise flanges.*

* * * * *